US012768423B2

(12) United States Patent
Kuroiwa et al.

(10) Patent No.: US 12,768,423 B2
(45) Date of Patent: Oct. 20, 2026

(54) VALVE AND SHOCK ABSORBER

(71) Applicant: KYB Corporation, Tokyo (JP)

(72) Inventors: Yuki Kuroiwa, Tokyo (JP); Takao Murata, Tokyo (JP); Takeshi Yasui, Tokyo (JP)

(73) Assignee: KYB CORPORATION, Tokyo (JP)

( * ) Notice: Subject to any disclaimer, the term of this patent is extended or adjusted under 35 U.S.C. 154(b) by 349 days.

(21) Appl. No.: 18/580,456

(22) PCT Filed: Nov. 1, 2022

(86) PCT No.: PCT/JP2022/040866
§ 371 (c)(1),
(2) Date: Jan. 18, 2024

(87) PCT Pub. No.: WO2023/095571
PCT Pub. Date: Jun. 1, 2023

(65) Prior Publication Data

US 2024/0344581 A1 Oct. 17, 2024

(30) Foreign Application Priority Data

Nov. 26, 2021 (JP) ................................ 2021-192284

(51) Int. Cl.
*F16F 9/19* (2006.01)
*F16F 9/348* (2006.01)

(52) U.S. Cl.
CPC .............. *F16F 9/19* (2013.01); *F16F 9/3481* (2013.01); *F16F 9/3482* (2013.01)

(58) Field of Classification Search
CPC .................................... F16F 9/19; F16F 9/348
See application file for complete search history.

(56) References Cited

U.S. PATENT DOCUMENTS

2011/0024247 A1* 2/2011 Chikamatsu ............ F16F 9/512 188/322.15
2013/0105261 A1* 5/2013 Murata ................ F16F 9/3485 188/322.14

(Continued)

FOREIGN PATENT DOCUMENTS

JP S62-156637 U 10/1987
JP 2008-138696 A 6/2008

(Continued)

OTHER PUBLICATIONS

Jul. 8, 2025, Japanese Office Action issued for related JP Application No. 2021-192284.

*Primary Examiner* — Tan Q Nguyen
(74) *Attorney, Agent, or Firm* — Paratus Law Group, PLLC

(57) ABSTRACT

Valves of the present invention includes: a valve seat member equipped with a port and a seat portion surrounding an outlet end of the port; and an annular leaf valve whose inner periphery is immovably laid on top of the valve seat member and whose outer periphery to be seated on or spaced apart from the seat portion, wherein an external shape of the leaf valve is larger than an internal shape of a seat surface of the seat portion or larger than a virtual circle passing through an inner periphery of a seat surface of each circular arc shaped portion on the seat portion, and is smaller than an external shape of the seat surfaces or smaller than a virtual circle passing through an outer periphery of the seat surface of each circular arc shaped portion.

10 Claims, 11 Drawing Sheets

(56) References Cited

U.S. PATENT DOCUMENTS

| | | | | |
|---|---|---|---|---|
| 2016/0090146 A1* | 3/2016 | Murakami | F16F 9/3488 | |
| | | | 188/266.2 | |
| 2016/0245361 A1* | 8/2016 | Miwa | F16F 9/3481 | |
| 2021/0123493 A1* | 4/2021 | Matsuda | F16F 9/19 | |

FOREIGN PATENT DOCUMENTS

| | | | |
|---|---|---|---|
| JP | 2009-204147 | A | 9/2009 |
| JP | 2013-133831 | A | 7/2013 |
| JP | 2016-070459 | A | 5/2016 |

* cited by examiner

VALVE AND SHOCK ABSORBER

CROSS REFERENCE TO PRIOR APPLICATION

This application is a National Stage Patent Application of PCT International Patent Application No. PCT/JP2022/040866 (filed on Nov. 1, 2022) under 35 U.S.C. § 371, which claims priority to Japanese Patent Application No. 2021-192284 (filed on Nov. 26, 2021), which are all hereby incorporated by reference in their entirety.

TECHNICAL FIELD

The present invention relates to a valve and a shock absorber.

BACKGROUND ART

Conventionally known valves include such a valve as disclosed in JP 2013-133831 A, for example, which is used in parts such as a piston portion in a shock absorber utilized for a vehicle suspension, and included with a piston having a port that makes communication between working chambers compartmentalized in the shock absorber, and with an annular leaf valve stacked on the piston and configured to open and close the port.

Such a valve employs a structure in which a circular annular shaped seat portion surrounding the outer peripheral side of the port is provided at the end portion of the piston, the inner periphery of the leaf valve is fixedly supported and laid on top of the piston, and the outer periphery of the leaf valve is allowed to be seated on the seat portion.

The deflection of the outer periphery of the leaf valve is allowed in the valve having the above-described structure, and thus the leaf valve deflects and moves apart from the seat portion to open the port and create resistance to the flow of hydraulic oil passing through the port to generate a damping force upon the pressure at the upstream side of the port reached to the valve opening pressure.

Furthermore, the leaf valve is provided with a cutout orifice opened from the outer periphery, and when the speed (piston speed) during extension and compression of the shock absorber is within low speed range, the hydraulic oil is allowed to pass through the cutout orifice prior to the opening of the port of the leaf valve. Hence, a shock absorber equipped with such a valve can exert a damping force suitable for a comfortable ride quality of the vehicle in accordance with the piston speed.

CITATION LIST

Patent Literature

Patent Literature 1: JP 2013-133831 A

SUMMARY OF INVENTION

Technical Problem

In the valve, the outer periphery of the leaf valve is configured to move apart from and sit on the seat portion to open and close the port, however, the leaf valve sometimes sticks fast to the seat portion upon sitting on the seat portion and cannot smoothly move apart from the seat portion.

When the leaf valve sticks fast to the seat portion in this manner, the leaf valve cannot move apart from the seat portion unless the pressure acting through the port becomes higher than the designed valve opening pressure. Hence, the leaf valve vigorously moves apart from the seat portion at the time when the valve is opened and thus the leaf valve vibrates, this vibration is transmitted via the piston rod to the vehicle body in the vehicle on which the shock absorber is mounted to cause the passenger to perceive abnormal sound.

The abnormal sound is perceived as noise by the passenger, and thus becomes one factor to deteriorate quietness in the vehicle.

Therefore, an object of the present invention is to provide a valve and a shock absorber capable of preventing the occurrence of the abnormal sound and improving quietness in the vehicle.

Solution to Problem

In order to achieve the above-mentioned object, a valve of the present invention includes: a valve seat member equipped with a port and a seat portion, the seat portion having an annular shape and protruding from an end portion of the seat portion on an outlet end side of the port and surrounding the outlet end; and a leaf valve having an annular shape, an inner periphery of the leaf valve being immovably laid on top of the valve seat member and an outer periphery of the leaf valve being to be spaced apart from or seated on the seat portion, in which an external shape of the leaf valve is larger than an internal shape of a seat surface of the seat portion that the leaf valve to be spaced apart from or seated on, and smaller than an external shape of the seat surface of the seat portion.

In order to achieve the above-mentioned object, a valve according to another invention includes: a valve seat member equipped with a port and a seat portion, the seat portion protruding from an end portion of the seat portion on an outlet end side of the port and surrounding the outlet end, and part of the seat portion including a plurality of circular arc shaped portions arranged on an identical circumference; and a leaf valve having a circular annular shape, an inner periphery of the leaf valve being immovably laid on top of the valve seat member and an outer periphery of the leaf valve being to be spaced apart from or seated on the seat portion, in which an outer diameter of the leaf valve is larger than a diameter of a virtual circle passing through an inner periphery on a seat surface of each of the circular arc shaped portions that the leaf valve to be spaced apart from or seated on, and is smaller than a diameter of a virtual circle passing through an outer periphery of the seat surface of each of the circular arc shaped portions.

According to the valve configured as described above, the contact area of the leaf valve to the seat portion can be made smaller to reduce the sticking force of the leaf valve to the seat portion, so that the vibration of the leaf valve at the time when the leaf valve moves apart from the seat portion can be suppressed.

DESCRIPTION OF EMBODIMENTS

Figure 1:
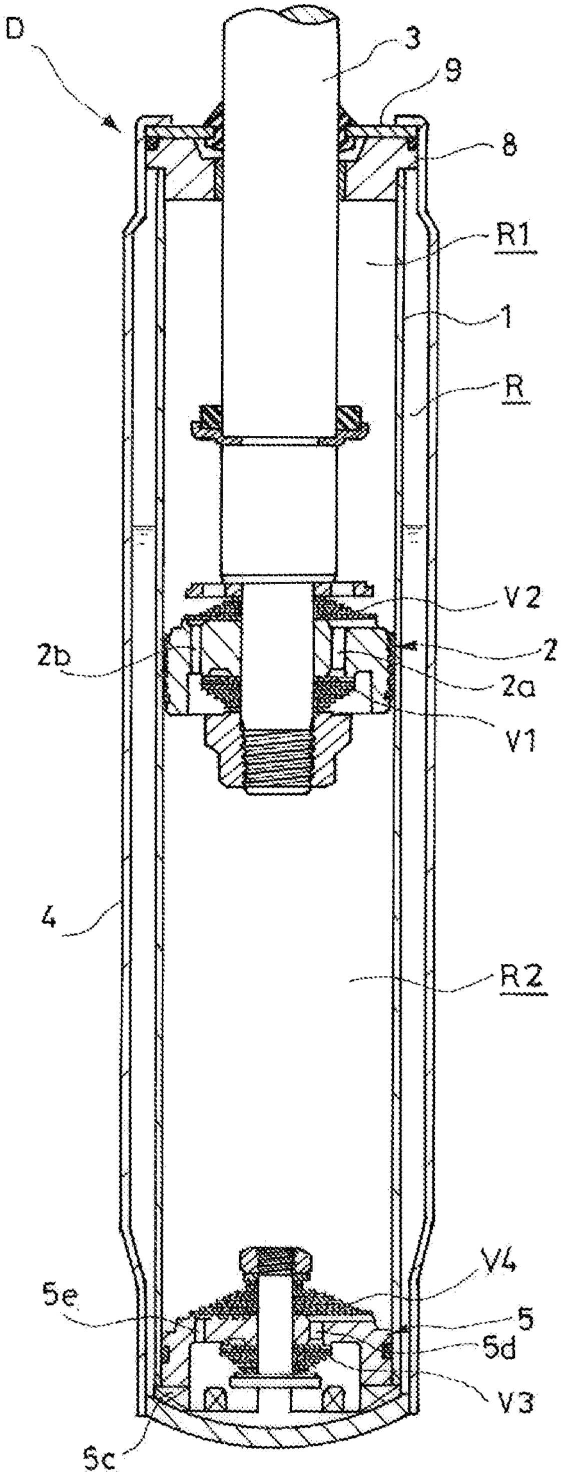
FIG. 1 is a cross-sectional view of a shock absorber according to one embodiment.

Hereinafter, a valve and a shock absorber of the present invention will be described based on the accompanying drawings. A first valve V1, a second valve V2, a third valve V3, and a fourth valve V4 as valves in one embodiment are used as an extension-side damping valve and a compression-side damping valve of a piston portion of a shock absorber D, and a compression-side damping valve and a check valve of a base valve portion, respectively, as shown in FIG. 1.

The portions in the valves V1, V2, V3, and V4 and the shock absorber D will be described in detail below. The shock absorber D includes: a cylinder 1; a piston 2 that is movably inserted into the cylinder 1 and compartmentalizes the inside of the cylinder 1 into an extension side chamber R1 as a working chamber and a compression side chamber R2 as a working chamber; a piston rod 3 that is inserted into the cylinder 1 and connected to the piston 2; an outer tube 4 as a tube that covers the cylinder 1 and forms a reservoir R as a working chamber between the outer tube 4 and the cylinder 1; a valve casing 5 that is provided at an end portion of the cylinder 1 and partitions the compression side chamber R2 off from the reservoir R; a first valve V1 and a second valve V2 as valves in a piston portion, and a third valve V3 and a fourth valve V4 as valves in a base valve portion.

The cylinder 1 has a cylindrical shape, and the piston 2 is movably inserted inside the cylinder 1 as described above, and the extension side chamber R1 is compartmentalized above the piston 2 in FIG. 1, and the compression side chamber R2 is compartmentalized below the piston 2 in FIG. 1. In each of the extension side chamber R1 and the compression side chamber R2 is filled a hydraulic liquid, specifically, for example, a hydraulic oil. Note that, examples of hydraulic liquids that can be used include liquids, such as water and aqueous solutions, besides hydraulic oils.

The cylinder 1 is accommodated in the outer tube 4 having a bottomed cylindrical shape and disposed on the outer peripheral side, and the reservoir R is formed in an annular gap between the cylinder 1 and the outer tube 4. The hydraulic oil and gas are filled in the reservoir R in this case, and an inert gas such as nitrogen is preferably used as the gas in order to prevent deterioration of the hydraulic oil when using a hydraulic oil as the liquid.

At the lower end of the cylinder 1 in FIG. 1 is provided the valve casing 5 being fitted thereinto, whereby the compression side chamber R2 and the reservoir R are partitioned off from each other; and into the upper end of the cylinder 1 in FIG. 1 is fitted a rod guide 8 that slidably and pivotally supports the piston rod 3. This rod guide 8 is fitted into an inner periphery of the outer tube 4 and is fixed to the outer tube 4 together with a seal member 9 that is stacked on an upper side of the rod guide 8 in FIG. 1 and seals gaps between each of the outer tube 4, the cylinder 1 and the piston rod 3 by crimping an upper end of the outer tube 4. When fixing the rod guide 8 to the outer tube 4 in this manner, the cylinder 1 is sandwiched between the rod guide 8 and the valve casing 5 placed on the bottom portion of the outer tube 4, and the cylinder 1 is also fixed inside the outer tube 4 together with the valve casing 5. Alternatively, instead of crimping the top open end of the outer tube 4, a cap may be screwed to the top opening edge, and in between this cap and the bottom portion of the outer tube 4 may be sandwiched the seal member 9, the rod guide 8, the cylinder 1 and the valve casing 5, thereby fixing these members inside the outer tube 4.

Figure 2:
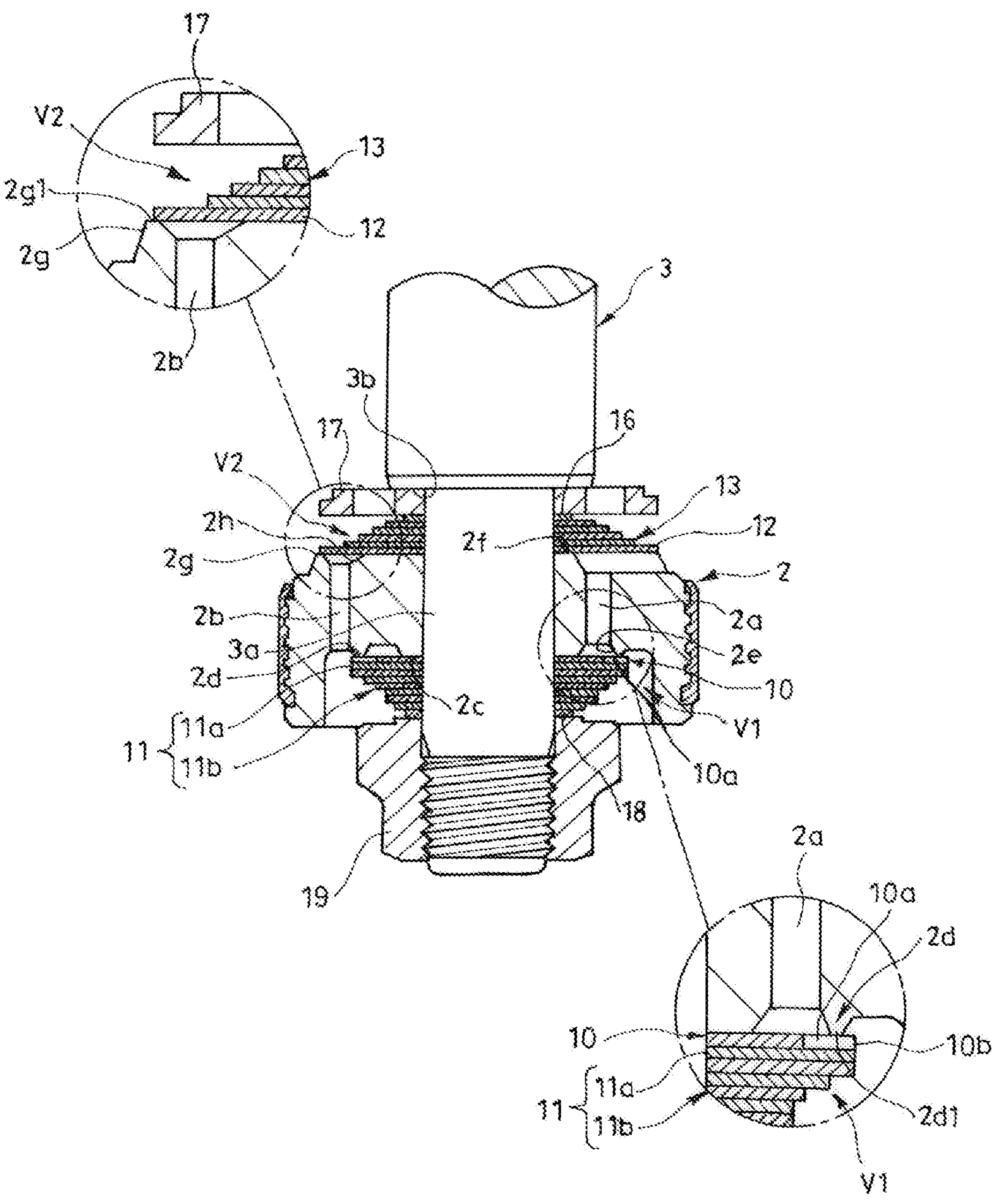
FIG. 2 is an enlarged cross-sectional view of a piston portion of the shock absorber according to one embodiment.

The piston 2 has an annular shape, is formed as a valve seat member in the valve V1 as illustrated in FIGS. 1 and 2, and is fixed to a lower end in FIG. 1 (which is one end) of the piston rod 3. The piston 2 as a valve seat member includes: an extension side port 2*a* as a port allowing communicating between the extension side chamber R1 and the compression side chamber R2; and a compression side port 2*b* as a port allowing communicating between the compression side chamber R2 and the extension side chamber R1. Note that, in the present embodiment, a plurality of the extension side ports 2*a* and a plurality of the compression side ports 2*b* are provided in the piston 2, specifically, there are eight ports in each of them, and the ports each are arranged on an identical circumference centered around the axial center of the piston 2 with respect to the piston 2.

Figure 3:
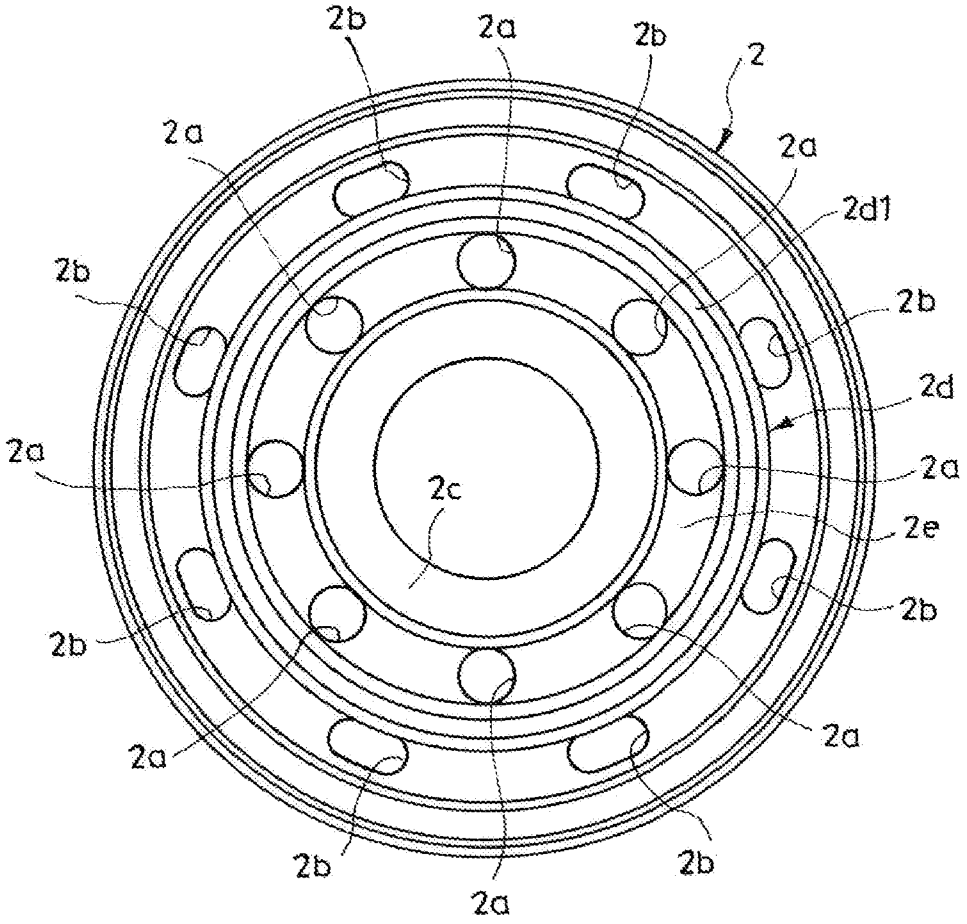
FIG. 3 is an enlarged bottom view of a piston as a valve seat member in a first valve of one embodiment.

In addition, the piston 2 includes a circular annular shaped inner peripheral seat portion 2*c* that protrudes toward the compression side chamber R2 on the downward side from the lower end (which is the end portion on the outlet end side) of the extension side port 2*a* in FIG. 2 and is disposed on the inner periphery of the outlet ends of all the extension side ports 2*a* as illustrated in FIGS. 2 and 3. Furthermore, the piston 2 includes a circular annular shaped extension-side seat portion 2*d* that protrudes toward the compression side chamber R2 on the downward side from the lower end (which is the end portion on the outlet end side) of the extension side port 2*a* in FIG. 2, is disposed on the outer periphery of the entirety of the outlet ends of the extension side ports 2*a*, and surrounds the entirety of the extension side ports 2*a*. The extension-side seat portion 2*d* has a circular annular shape centered on the axial center of the piston 2, and is included in the seat portion in the present invention. In this manner, the circular annular shaped inner peripheral seat portion 2*c* disposed on the inner periphery of the outlet end of the extension side port 2*a* and the circular annular shaped extension-side seat portion 2*d* disposed on the outer periphery of the outlet end of the extension side port 2*a* form an annular window 2*e* that is a circular annular shaped concave portion communicating with the entirety of the outlet ends of the extension side ports 2*a*.

Figure 4:
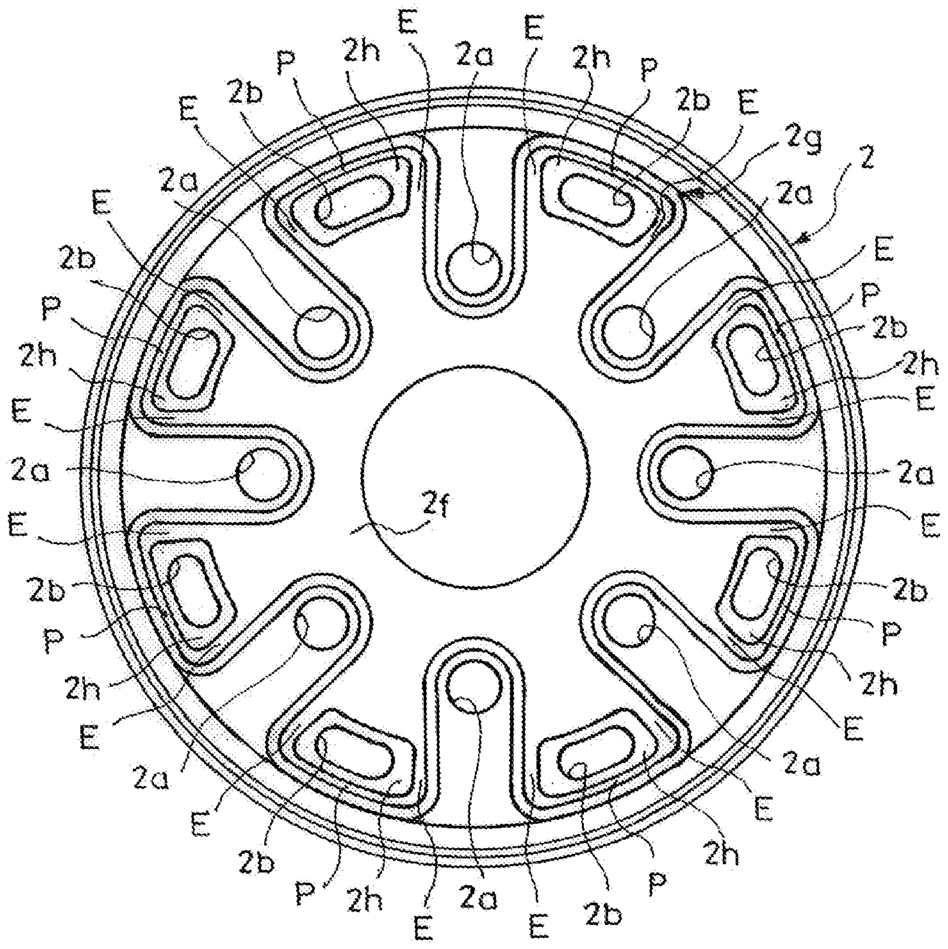
FIG. 4 is an enlarged plan view of a piston as a valve seat member in a second valve of one embodiment.

Furthermore, the piston 2 includes a circular annular shaped inner peripheral seat portion 2*f* that protrudes toward the extension side chamber on the upward side from the upper end (which is the end portion on the outlet end side) of the compression side port 2*b* in FIG. 2 and is disposed on the inner periphery of the outlet ends of all the compression side ports 2*b* as illustrated in FIGS. 2 and 4. Furthermore, the piston 2 includes a petal-shaped compression-side seat portion 2*g* that protrudes toward the extension side chamber on the upward side from the upper end (which is the end portion on the outlet end side) of the compression side port 2*b* in FIG. 2, and surrounds the outer peripheral side and both sides in the circumferential direction of the outlet end of each of the compression side ports 2*b*. The compression-side seat portion 2*g* is provided with seat portion elements, each of which includes: a pair of opposing portions E extending from the outer periphery of the inner peripheral seat portion 2*f* toward the outer periphery and sandwiching one of the compression side ports 2*b* in the circumferential direction; and a circular arc shaped portion P connected to the distal ends of the opposing portions E, and surrounds one of the compression side ports 2*b* in cooperation with the inner peripheral seat portion 2*f*, in the same number as the number of the compression side ports 2*b*. In this manner, the compression-side seat portion 2*g* is configured to be a petal-shaped type, surrounds the outlet ends of the compression side port 2*b* each individually, and included in the seat portion in the present invention; and the circular arc shaped portions P, each of which is disposed on the outer peripheral side of each of the compression side ports 2*b*, are arranged on an identical circumference centered around the axial center of the piston 2. In this manner, independent opening windows 2*h* (each of which includes an independent fan-shaped concave portion) are formed at the outlet ends of the compression side ports 2*b* in the same number as the compression side ports 2*b* by the circular annular shaped inner peripheral seat portion 2*f* disposed on the inner periphery of the outlet ends of the compression side ports 2*b* and the petal-shaped compression-side seat portion 2*g* disposed on the outer periphery of the outlet ends of the compression side ports 2*b*.

Note that, as shown in FIG. 4, the openings of the extension side ports 2*a* on the inlet side each are disposed between a portion surrounding the compression side port 2*b* and a portion surrounding the adjacent compression side port 2*b* in the petal-shaped compression-side seat portion 2*g* of the piston 2, and communicate with the extension side chamber R1 without being surrounded by the compression-side seat portion 2*g*. Also as shown in FIG. 4, the opening of the compression side port 2*b* on the inlet side is disposed on the outer peripheral side of the circular annular shaped extension-side seat portion 2*d* of the piston 2, and communicates with the compression side chamber R2 without being surrounded by the extension-side seat portion 2*d*. Note that, the provided number of each of the extension side ports 2*a* and the compression side ports 2*b* is set freely and may be one.

Next, on top of the compression side chamber R2 side (which is the downward side) of the piston 2 in FIG. 2 are laid stacked leaf valves including: an annular leaf valve 10 to be spaced apart from or seated on the extension-side seat portion 2*d*; and a group of multiple annular plates 11 stacked on the side of the leaf valve 10 opposite to the piston.

Figure 5:
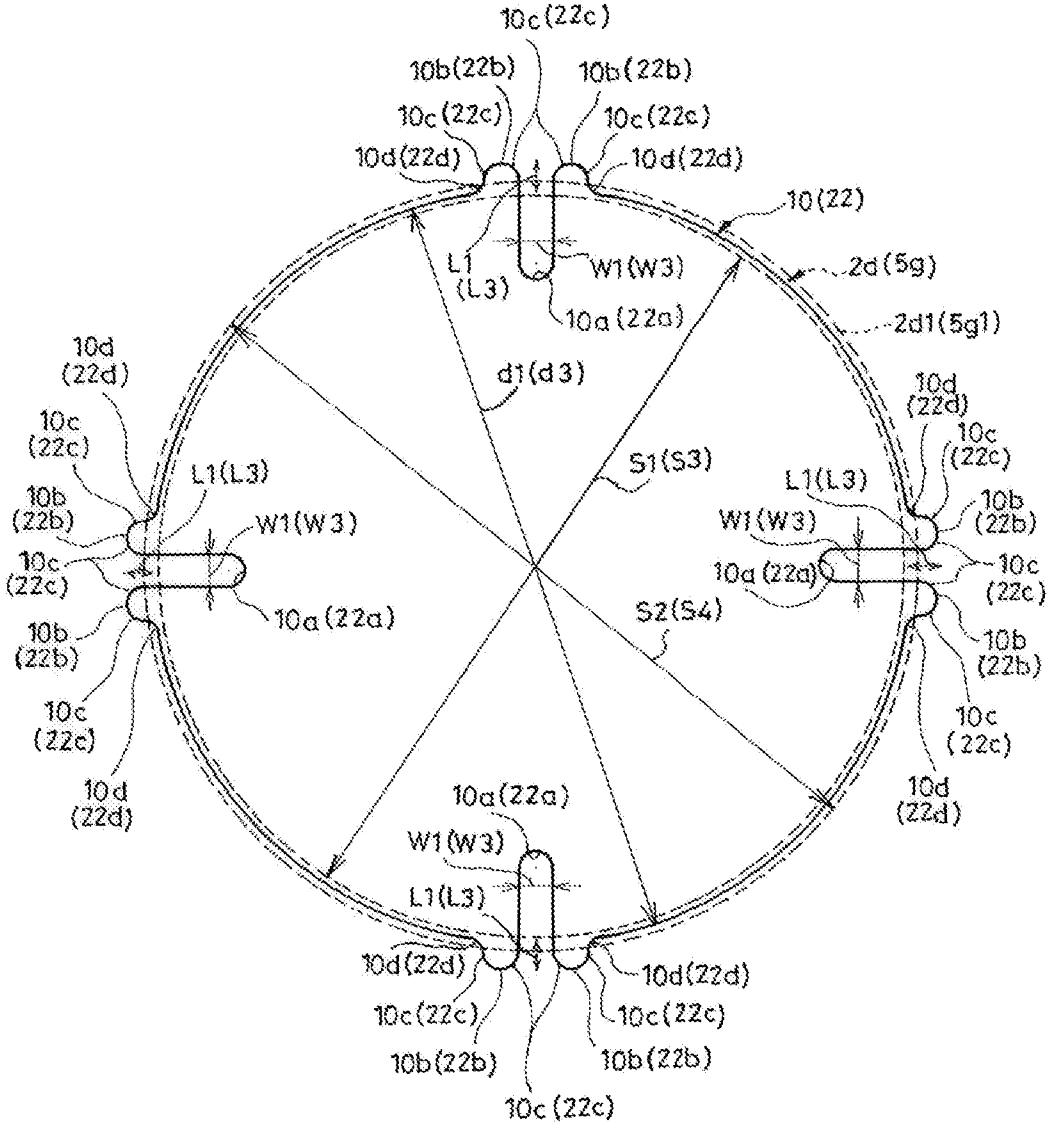
FIG. 5 is an enlarged plan view of a leaf valve in a first valve and in a third valve of one embodiment.

The leaf valve 10 has an annular shape as shown in FIG. 5, and is concentrically disposed and laid on top of the extension-side seat portion 2*d* indicated by a dashed line in FIG. 5, and an outer diameter d1 of the leaf valve 10 is smaller than an outer diameter S2 of a seat surface 2*d*1 of the extension-side seat portion 2*d* and is larger than an inner diameter S1 of the seat surface of the extension-side seat portion 2*d*. Note that, the seat surface 2*d*1 on the extension-side seat portion 2*d*, which is a surface that the leaf valve 10 to be spaced apart from or seated on, is a lower end surface of the extension-side seat portion 2*d* in FIG. 2. The leaf valve 10 may be eccentrically laid on top of the extension-side seat portion 2*d* of the piston 2 so that not all the way around but part of the outer peripheral edge is disposed between the inner periphery and the outer periphery of the seat surface 2*d*1 as long as the leaf valve 10 abuts on the entire circumference of the seat surface 2*d*1. Note that, a hole provided in the central portion of the leaf valve 10 is omitted from illustration in FIG. 5.

In addition, the leaf valve 10 includes four cutout orifices 10*a* formed by notching along the radial direction from the outer periphery. In the present embodiment, the cutout orifices 10*a* are provided at equal intervals in the circumferential direction with respect to the leaf valve 10, but the provided location and the provided number of cutout orifices 10*a* can be modified freely.

Furthermore, the leaf valve 10 includes protrusions 10*b*, 10*b* protruding outward from the outer peripheries on both sides in the circumferential direction of the cutout orifice 10*a*. The protrusions 10*b*, 10*b* include chamfered portions 10*c*, 10*c* that are formed on both sides in the circumferential direction of the distal ends and chamfered to have round profile, and protrude toward the outer peripheral side further radically outward from the extension-side seat portion 2*d* in a state where the leaf valve 10 is seated on the extension-side seat portion 2*d*. The protrusions 10*b*, 10*b* in FIG. 5 include chamfered portions 10*c*, 10*c* at both ends in the circumferential direction of the distal end, and thus have a shape approximating a semicircular shape when viewed from the axial direction.

The shape of the cutout orifice 10*a* on the base end side (which is the center side of the leaf valve 10) is formed to be circular arc shaped and radically extends in a straight line, and the cutout orifice 10*a* has a constant width of W1 within the range of the outer diameter d1 of the leaf valve 10 except for the base end. Since the chamfered portions 10*c*, 10*c* are provided only in the protrusions 10*b*, 10*b*, the width of the cutout orifice 10*a* in the range L1 between the protrusions 10*b*, 10*b* gradually increases toward the outer periphery of the leaf valve 10. Note that, an orifice, which is formed by stamping or the like, may be provided in the extension-side seat portion 2*d* that the leaf valve 10 is to be spaced apart from or seated on.

The annular plate group 11 stacked on the side of the leaf valve 10 facing toward the compression side chamber R2 is configured to include: an annular plate 11*a* that abuts on the side surface of the leaf valve 10 opposite to the piston; and multiple annular plates 11*b* stacked on the side of the annular plate 11*a* opposite to the piston. The annular plate 11*a* (disposed at the uppermost position in FIG. 2) in contact with the leaf valve 10 has an outer diameter set to be equal to or larger than the outer diameter d1 of the leaf valve 10. Thus, the extension side port 2*a* is allowed to communicate with the compression side chamber R2 through the cutout orifice 10*a* in a state where the leaf valve 10 is seated on the seat surface 2*d*1 of the extension-side seat portion 2*d* and the annular plate 11*a* abuts on the side surface of the leaf valve 10 opposite to the piston. In this case, a portion where the flow passage has a smallest area in the flow passage from the extension side port 2*a* to the compression side chamber R2 is an opening edge having an opening on the outer periphery of the leaf valve 10 in the cutout orifice 10*a* sandwiched in between the annular plate 11*a* and the seat surface 2*d*1 of the extension-side seat portion 2*d*, and this opening edge has a flow passage area that is equal to the area obtained when multiplying the width W1 of the cutout orifice 10*a* by the thickness of the leaf valve 10. In this manner, the cutout orifice 10*a* restricts the flow passage area to the aforementioned area of the opening edge and functions as an orifice in a state where the leaf valve 10 is sandwiched in between and abuts on the extension-side seat portion 2*d* and the annular plate 11*a*. Note that, the outer diameter of the annular plate 11*a* is required to be equal to or larger than the inner diameter S1 of the seat surface.

The outer diameters of the other multiple annular plates 11*b* become smaller as the annular plates are disposed closer to the compression side chamber R2, but the design thereof can be freely modified. Note that, the first valve V1 of the present embodiment is configured to include: the piston 2 as a valve seat member provided with the extension side port 2*a* as a port and the circular annular shaped extension-side seat portion 2*d* surrounding the extension side port 2*a*; the leaf valve 10; and the annular plate 11*a*. In addition, the number of the annular plates 11*b* can be set freely, and it is also possible to adopt an aspect in which the entirety of the annular plate group 11 is not provided when the cutout orifice 10*a* is not provided in the leaf valve 10.

Furthermore, on top of the upper side (facing toward the extension side chamber R1) of the piston 2 in FIG. 2 are laid stacked leaf valves configured to include: an annular leaf valve 12 to be spaced apart from or seated on the compression-side seat portion 2*g*; and an annular plate group 13 including multiple annular plates stacked on the side of the leaf valve 12 opposite to the piston.

Figure 6:
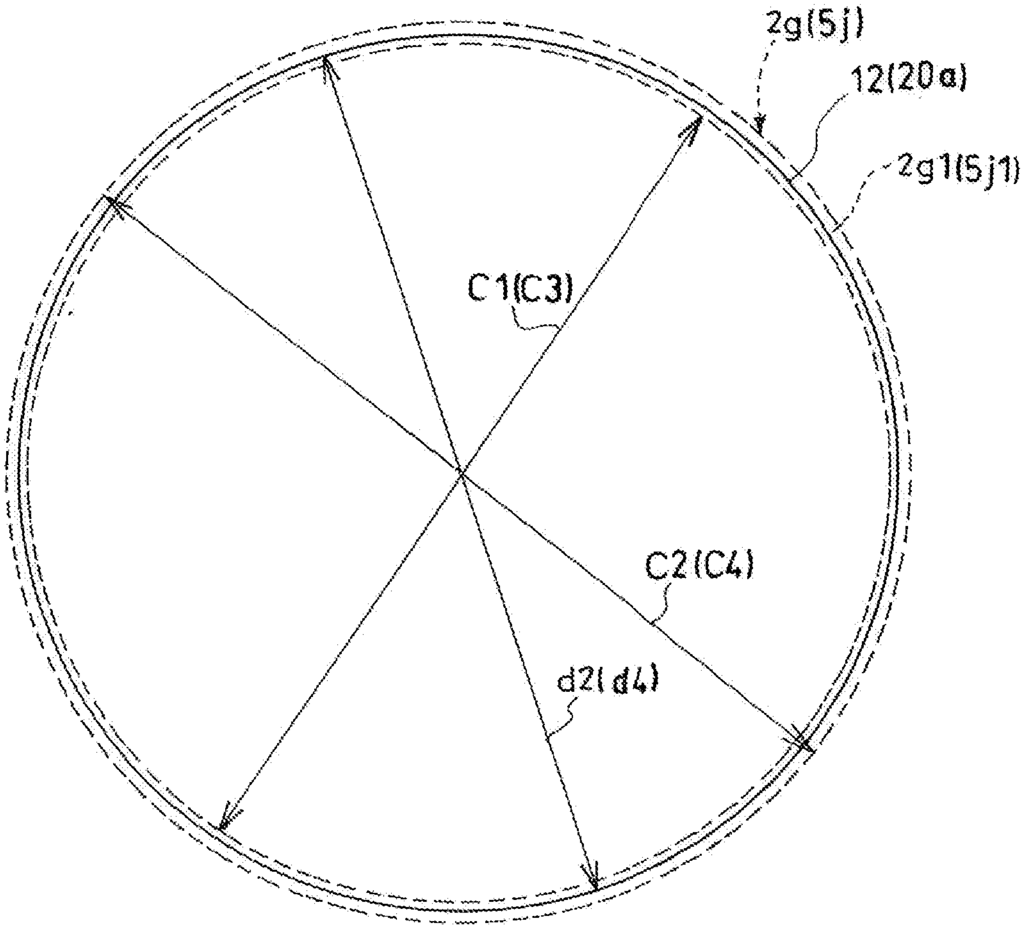
FIG. 6 is an enlarged plan view of a leaf valve in a second valve of one embodiment.

The leaf valve 12 has an annular shape and is concentrically disposed and laid on top of the circular arc shaped portion P of the compression-side seat portion 2*g*, and the outer diameter d2 is larger than the diameter of a virtual circle C1 (indicated by the dashed line) passing through the inner periphery on a seat surface 2*g*1 of the circular arc shaped portion P of the compression-side seat portion 2*g* and smaller than the diameter of a virtual circle C2 passing through the outer periphery on the seat surface 2*g*1 of each of the circular arc shaped portions P as illustrated in FIG. 6. The seat surface 2*g*1 of the compression-side seat portion 2*g* is a surface that the leaf valve 12 to be spaced apart from or seated on, and is an upper end surface of the compression-side seat portion 2*g* in FIG. 2. The leaf valve 12 may be eccentrically laid on top of the circular arc shaped portion P of the compression-side seat portion 2*g* in the piston 2 such that not all the way around but part of the outer peripheral edge of the leaf valve is disposed within the range of the virtual circle C1 and the virtual circle C2 as long as the leaf valve 12 abuts on the entirety of the circular arc shaped portion P of the compression-side seat portion 2*g*. Note that, a hole provided in the central portion of the leaf valve 12 is omitted from illustration in FIG. 6.

Note that, unlike the leaf valve 10, the leaf valve 12 does not include any cutout orifice and any protruding portion, but may have a cutout orifice, and the leaf valve 12 when provided with a cutout orifice may include a protruding portion on one side or both sides in the circumferential direction of the cutout orifice. In addition, when the leaf valve 12 includes a cutout orifice, the leaf valve 12 is required to be laid on top of the piston 2 with being positioned in the circumferential direction so the cutout orifice as to face the circular arc shaped portion P of the compression-side seat portion 2*g*. Note that, regardless of whether or not the cutout orifice is provided in the leaf valve 12, the compression-side seat portion 2*g* may be provided with an orifice formed by stamping or the like.

The annular plate group 13 stacked on the side of the leaf valve 12 facing toward the extension side chamber R1 is configured to include multiple annular plates. The outer diameters of annular plates in the annular plate group 13 are smaller as the annular plates are disposed closer to the extension side chamber R1, but the design thereof can be freely modified. Note that, the second valve V2 of the present embodiment is configured to include: the piston 2 as a valve seat member including a compression side port 2*b* and a compression-side seat portion 2*g* surrounding the compression side port 2*b*; and the leaf valve 12. In addition, the number of annular plates in the annular plate group 13 can be se freely, and it is also possible to adopt an aspect in which no annular plate group 13 is provided on the side of the leaf valve 12 opposite to the piston. When the leaf valve 12 is provided with a cutout orifice, the outer diameter of the annular plate abutting on the leaf valve 12 in the annular plate group 13 is required to be larger than the diameter of the virtual circle C1 passing through the inner periphery on the seat surface 2*g*1 of the circular arc shaped portion P of the compression-side seat portion 2*g*.

The annular plate group 13, the leaf valve 12, the piston 2, the leaf valve 10, and the annular plate group 11 are sequentially assembled to the outer periphery of a small-diameter portion 3*a* provided at the lower end of the piston rod 3, and are fixed to the piston rod 3 with a piston nut 19 screwed to the distal end of the small-diameter portion 3*a*. Note that a spacer 16 having a smaller diameter than the annular plate group 13, and a valve stopper 17 to regulate excessive deflection of the leaf valve 12 and the annular plate group 13 are stacked on the upper side of the annular plate group 13 in FIG. 2, and a spacer 18 having a smaller diameter than the annular plate 11*b* is stacked on the lower side of the annular plate group 11 in FIG. 2, and they are fixed to the outer periphery of the small-diameter portion 3*a* of the piston rod 3 with the piston nut 19 in the same manner as the piston 2.

More specifically, the inner peripheries of the leaf valve 10 and the annular plate group 11 and the inner peripheries of the leaf valve 12 and the annular plate group 13 are sandwiched in between a piston nut 19 and a step portion 3*b* formed at the boundary of the small-diameter portion 3*a* of the piston rod 3.

The leaf valve 10 is immovably fixed with the inner periphery abutting on the inner peripheral seat portion 2*c* of the piston 2, and the outer peripheral side of the leaf valve 10 is seated on the extension-side seat portion 2*d*. In a state where the leaf valve 10 is seated on the extension-side seat portion 2*d*, the first valve V1 is in closed state, and the extension side port 2*a* is allowed to communicate with the compression side chamber R2 only through the cutout orifice 10*a*. Since the extension side port 2*a* is always allowed to communicate with the extension side chamber R1, hydraulic oil about to pass through the extension side port 2*a* always passes through the cutout orifice 10*a* to move back and forth between the extension side chamber R1 and the compression side chamber R2 when the first valve V1 is in closed state. Therefore, the cutout orifice 10*a* creates resistance to the hydraulic oil flow passing through the extension side port 2*a* when the first valve V1 is closed.

In addition, the outer peripheral side of the leaf valve 10 and the annular plate group 11 are allowed to deflect with the outer edge of the spacer 18 being as a fulcrum of the deflection, and thus an increased pressure in the extension side chamber R1 acting via the extension side port 2*a* causes the outer peripheral side to deflect whereby the leaf valve 10 moves apart from the extension-side seat portion 2*d* to open the first valve V1. In a state where the first valve V1 is opened, the leaf valve 10 and the annular plate group 11 are both deflect to move the leaf valve 10 apart from the extension-side seat portion 2*d*, and hence the extension side port 2*a* is allowed to communicate with the compression side chamber R2 via an annular gap formed between the leaf valve 10 and the extension-side seat portion 2*d*, thereby creating resistance to the hydraulic oil flow passing through the gap.

The leaf valve 12 is immovably fixed with the inner periphery abutting on the inner peripheral seat portion 2*f* of the piston 2, and the outer peripheral side is seated on the compression-side seat portion 2*g*. In a state where the leaf valve 12 is seated on the compression-side seat portion 2*g*, the second valve V2 is closed to disconnect communication between the compression side port 2*b* and the extension side chamber R1. Since the compression side port 2*b* always communicates with the compression side chamber R2, when the second valve V2 is in closed state, the compression side port 2*b* is blocked off by the leaf valve 12, and the hydraulic oil cannot pass through the compression side port 2*b*.

In addition, since the outer peripheral sides of the leaf valve 12 and the annular plate group 13 are allowed to deflect with the outer edge of the spacer 16 being as a fulcrum of the deflection, an increased pressure in the compression side chamber R2 acting via the compression side port 2*b* causes the outer peripheral side thereof to deflect whereby the leaf valve 12 moves spaced apart from the compression-side seat portion 2*g* to open the second valve V2. In a state where the second valve V2 is opened, the leaf valve 12 and the annular plate group 13 both deflect and the leaf valve 12 moves spaced apart from the compression-side seat portion 2*g*, and thus the compression side port 2*b* is allowed to communicate with the extension side chamber R1 via an annular gap formed between the leaf valve 12 and the compression-side seat portion 2*g* to create resistance to the hydraulic oil flow passing through the gap.

Figure 7:
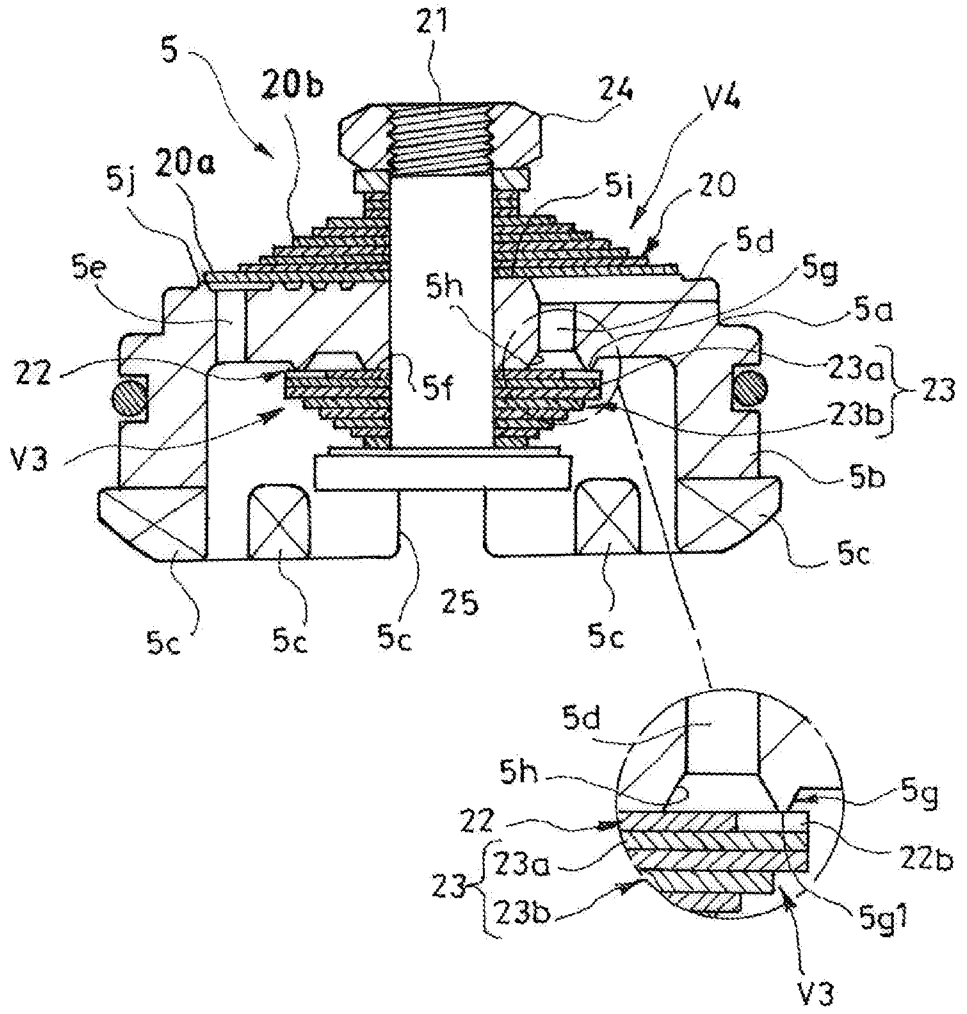
FIG. 7 is an enlarged cross-sectional view of a base valve portion of one embodiment.

As illustrated in FIGS. 1 and 7, the valve casing 5 has an annular shape and is configured to include: a small-diameter portion 5*a* having a small diameter and fitted to the lower end of the cylinder 1; a cylindrical skirt 5*b* provided on the outer periphery of the lower end; a notch 5*c* provided in the skirt 5*b* and communicating between the inside and outside of the skirt 5*b*; and a damping port 5*d* and a suction port 5*e* as ports allow communication from a compression side chamber end that is an upper end in FIG. 7 facing the compression side chamber R2 to an end opposite to compression side chamber facing the inside of the skirt 5*b*.

Note that, in the case of the present embodiment, multiple damping ports 5*d* are provided on an identical circumference in the valve casing 5, and also multiple suction ports 5*e* are provided on the circumference of a circle having a larger diameter than that of the circle on which the damping ports 5*d* are provided in the valve casing 5, however, the provided number of each of the multiple damping ports 5*d* and the multiple suction ports 5*e* is set freely and may be one.

The valve casing 5 is fixed to the outer tube 4 with being sandwiched in between the outer tube 4 and the cylinder 1 with the small-diameter portion 5*a* being fitted to the end portion of the cylinder 1 and the lower end of the skirt 5*b* abutting on the bottom portion of the outer tube 4, and partitions the compression side chamber R2 off from the reservoir R. The top open ends of the damping port 5*d* and of the suction port 5*e* both face the compression side chamber R2, and the bottom open ends thereof communicate with the reservoir R via the notch 5*c* provided in the skirt 5*b*, the damping port 5*d* and suction port 5*e* communicate between the compression side chamber R2 and the reservoir R. Note that the valve casing 5 is configured as a valve seat member in the third valve V3. The valve casing 5 is provided with a leaf valve 22 and an annular plate 23*a* of the third valve V3, and a check valve 20, which are attached to the valve casing 5 as a valve seat member with a guide rod 21 to be placed on the outer periphery.

Figure 8:
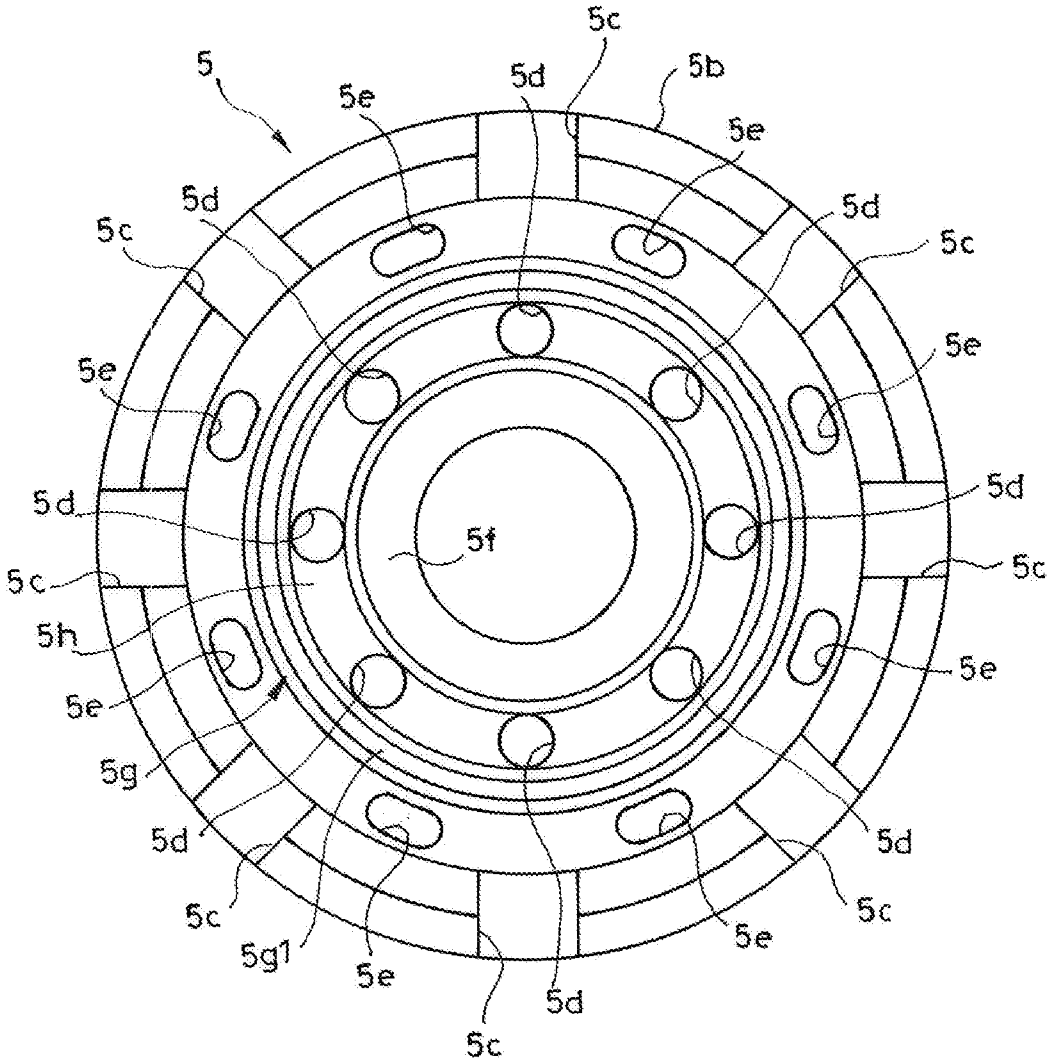
FIG. 8 is an enlarged bottom view of a valve casing as a valve seat member in a third valve of one embodiment.

In addition, the valve casing 5 as a valve seat member includes a circular annular shaped inner peripheral seat portion 5*f* that protrudes toward the reservoir R on the downward side from the lower end (which is the end portion on the outlet end side) of the damping port 5*d* in FIG. 7, and is disposed on the inner periphery of the outlet ends of all the damping ports 5*d* as illustrated in FIGS. 7 and 8. Additionally, the valve casing 5 includes a circular annular shaped seat portion 5*g* that protrudes toward the reservoir on the downward side from the lower end (which is the end portion on the outlet end side) of the damping port 5*d* in FIG. 7, and is disposed on the outer periphery of the entirety of the outlet ends of the damping ports 5*d* to surround all the damping ports 5*d*. The seat portion 5*g* has a circular annular shape centered on the axial center of the valve casing 5, and is included in the seat portion in the present invention. As described above, the circular annular shaped inner peripheral seat portion 5*f* disposed on the inner periphery of the outlet ends of the damping ports 5*d* and the circular annular shaped seat portion 5*g* disposed on the outer periphery of the outlet ends of the damping ports 5*d* form an annular window 5*h* that is a circular annular shaped concave portion communicating with the entirety of the outlet ends of the damping ports 5*d*.

Figure 9:
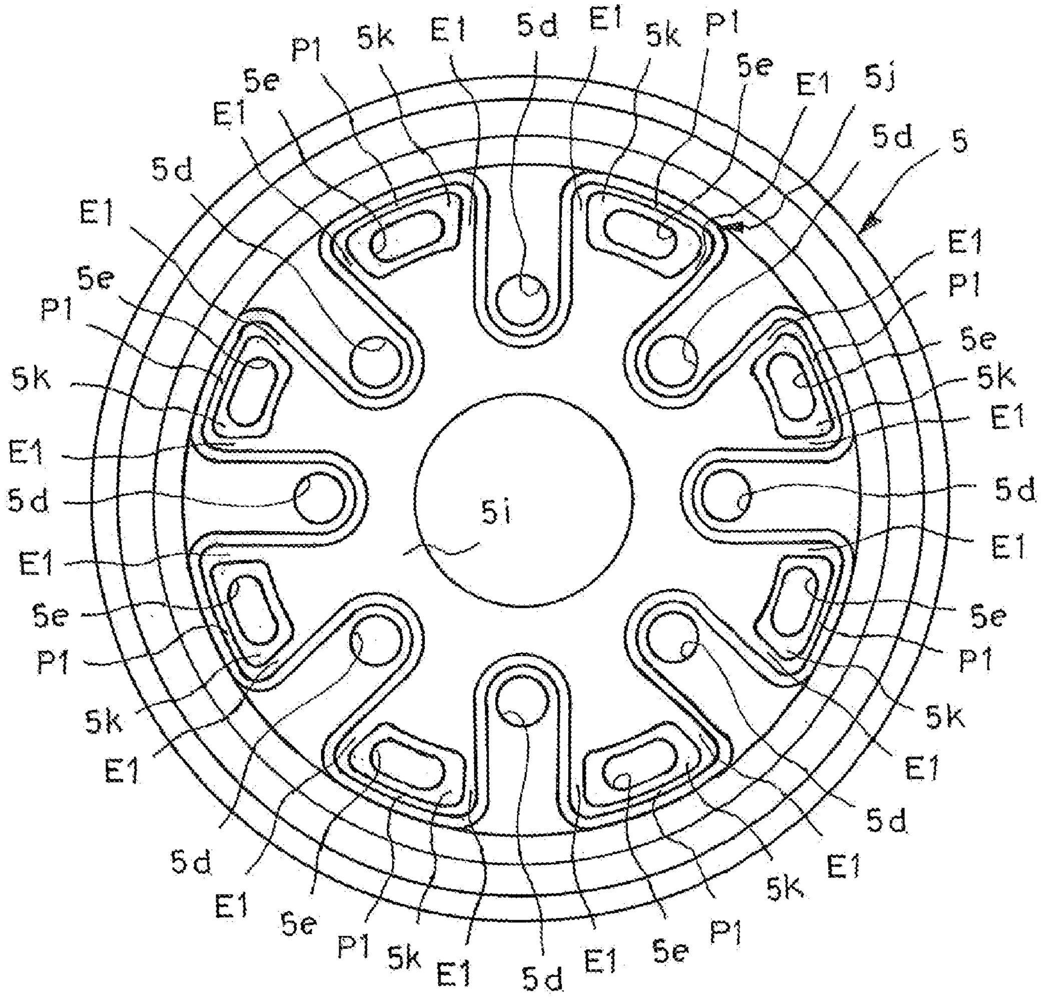
FIG. 9 is an enlarged bottom view of a valve casing as a valve seat member in a third valve of one embodiment.

Additionally, the valve casing 5 includes a circular annular shaped inner peripheral seat portion 5*i* that protrudes toward the compression side chamber R2 on the upward side from the upper end (which is the end portion on the outlet end side) of each of the suction ports 5*e* in FIG. 7, and is disposed on the inner periphery of the outlet ends of all the suction ports 5*e* as illustrated in FIGS. 7 and 9. Furthermore, the valve casing 5 includes a petal-shaped seat portion 5*j* that protrudes toward the compression side chamber R2 on the upward side from the upper end (which is the end portion on the outlet end side) of the suction port 5*e* in FIG. 7, and surrounds both sides in the circumferential direction and the outer peripheral side of the outlet end of each of the suction ports 5*e*. The petal-shaped seat portion 5*j* is provided with seat portion elements, each of which includes: a pair of opposing portions E1 extending from the outer periphery of the inner peripheral seat portion 5*i* toward the outer periphery side and sandwiching one of the suction ports 5*e* in the circumferential direction; and a circular arc shaped portion P1 connected to the distal ends of the opposing portions, and surrounds one of the suction ports 5*e* in cooperation with the inner peripheral seat portion 5*i*, in the same number as the number of the suction ports 5*e*. As described above, the petal-shaped seat portion 5*j* surrounds the outlet ends of the suction ports 5*e* each individually and is included in the seat portion in the present invention, and the circular arc shaped portions P1 each disposed on the outer peripheral side of each of the suction ports 5*e* are arranged on an identical circumference centered around the axial center of the valve casing 5. In this manner, independent opening windows 5*k* (each of which includes an independent fan-shaped concave portion) are formed at the outlet end of each suction port 5*e* in the same number as the suction ports 5*e* by the circular annular shaped inner peripheral seat portion 5*i* disposed on the inner periphery of the outlet end of the suction port 5*e* and the petal-shaped seat portion 5*j* disposed on the outer periphery of the outlet end of the suction port 5*e*.

Note that, the opening on the inlet side of the damping port 5*d* is disposed between a portion surrounding the suction port 5*e* and a portion surrounding the adjacent suction port 5*e* in the petal-shaped seat portion 5*j* of the valve casing 5 as illustrated in FIG. 9, and communicates with the compression side chamber R2 without being surrounded by the petal-shaped seat portion 5*j*. In addition, the opening on the inlet side of the suction port 5*e* is disposed on the outer peripheral side of the circular annular shaped seat portion 5*g* of the valve seat 5 as illustrated in FIG. 8, and communicates with the reservoir R without being surrounded by the seat portion 5*g*. Note that, the provided number of each of the damping ports 5*d* and the suction ports 5*e* is set freely and may be one.

Next, on top of the lower side (facing toward the reservoir R) of the valve casing 5 in FIG. 7 are laid stacked leaf valves including: the annular leaf valve 22 to be spaced apart from or seated on the seat portion 5*g*; and an annular plate group 23 including multiple annular plates stacked on the side of the leaf valve 22 opposite to the piston.

The leaf valve 22 has an annular shape and is disposed concentrically and laid on top of the seat portion 5*g*, and the outer diameter d3 of the leaf valve 22 is larger than the inner diameter S3 (indicated by a dashed line) of the seat portion 5*g* on the seat surface 5*g*1 as illustrated in FIG. 5, and smaller than the outer diameter S4 of the seat portion 5*g* on the seat surface 5*g*1. Note that the seat surface 5*g*1 on the seat portion 5*g* is a surface that the leaf valve 22 to be spaced apart from or seated on, and is a lower end surface of the seat portion 5*g* in FIG. 7. The leaf valve may be eccentrically laid on top of the seat portion 5*g* on the valve casing 5 so that not all the way around but part of the outer peripheral edge is disposed between the inner periphery and the outer periphery of the seat surface 5*g*1 as long as the leaf valve 22 abuts on the seat surface 5*g*1 over the entire periphery. Note that, a hole provided in the central portion of the leaf valve 22 is omitted from illustration in FIG. 5.

The leaf valve 22 includes four cutout orifices 22*a* formed by notching along the radial direction from the outer periphery. In the present embodiment, the cutout orifices 22*a* are provided at equal intervals in the circumferential direction with respect to the leaf valve 22, but the location and the number of the cutout orifices 22*a* to be provided can be freely modified.

Furthermore, the leaf valve 22 includes protrusions 22*b*, 22*b* protruding toward the outer peripheral side on both sides in the circumferential direction of the cutout orifice 22*a*. The protrusions 22*b*, 22*b* include chamfered portions 22*c*, 22*c* having round profile formed by round chamfering of corners on both sides in the circumferential direction at the distal end, and radically protrude further outwardly with respect to the seat portion 5*g* in a state where the leaf valve 22 is seated on the seat portion 5*g*.

The shape of the cutout orifice 22*a* on the base end side (which is the center side of the leaf valve 22) is formed to be circular arc shaped and radically extends in a straight line, and the cutout orifice 22*a* has a constant width of W3 within the range of the outer diameter d3 of the leaf valve 22 except for the base end. Since the chamfered portions 22*c*, 22*c* are provided only in the protrusions 22*b*, 22*b*, the width of the cutout orifice 22*a* in the range L3 between the protrusions 22*b*, 22*b* gradually increases toward the outer periphery of the leaf valve 22. Note that, an orifice, which is formed by stamping or the like, may be provided in the extension-side seat portion 2*d* that the leaf valve 22 is to be spaced apart from or seated on.

The annular plate group 23 stacked on the side of the leaf valve 22 facing toward the reservoir R is configured to include multiple annular plates 23*a*, 23*b*. The annular plate 23*a* (disposed at the uppermost position in FIG. 7) in contact with the leaf valve 22 has an outer diameter set to be equal to or larger than the outer diameter of the leaf valve 22. Accordingly, in a state where the leaf valve 22 is seated on the seat surface 5*g*1 of the seat portion 5*g* and the annular plate 23*a* abuts on the side surface of the leaf valve 22 opposite to the valve casing, the damping port 5*d* is allowed to communicate with the reservoir R through the cutout orifice 22*a*. In this case, a portion where the flow passage has a smallest area in the flow passage from the damping port 5*d* to the reservoir R is an opening edge having an opening on the outer periphery of the leaf valve 22 in the cutout orifice 22*a* sandwiched in between the seat portion 5*g* and the annular plate 23*a*, and this opening edge has a flow passage area that is equal to the area obtained when multiplying the width W3 of the cutout orifice 22*a* by the thickness of the leaf valve 22. In this manner, the cutout orifice 22*a* restricts the flow passage area to the aforementioned area of the opening edge and functions as an orifice in a state where the leaf valve 22 is sandwiched in between and abuts on the seat portion 5*g* and the annular plate 23*a*. Note that, the annular plate 23*a* is required to be set to be equal to or larger than the inner diameter S3 of the seat surface 5*g*1.

The outer diameters of the other multiple annular plates 23*b* are smaller as the annular plates are disposed closer to the reservoir R, but the design thereof can be freely modified. Note that, the third valve V3 of the present embodiment is configured to include: the valve casing 5 as a valve seat member including the damping port 5*d* as a port and the circular annular shaped seat portion 5*g* surrounding the damping port 5*d*; the leaf valve 22; and the annular plate 23*a*. In addition, the number of the annular plates 23*b* can be freely set, and it is also possible to adopt an aspect in which the entirety of the annular plate group 23 is not provided when no cutout orifice 22*a* is provided in the leaf valve 22.

Furthermore, on top of the upper side (facing toward the compression side chamber R2) of the valve casing 5 in FIG. 7 is laid the check valve 20 including: an annular leaf valve 20*a* to be spaced apart from or seated on the petal-shaped seat portion 5*j*; and an annular plate group 20*b* including multiple annular plates stacked on the side of the leaf valve 20*a* opposite to the piston.

The leaf valve 20*a* has an annular shape and is disposed concentrically and laid on top of the circular arc shaped portion P1 of the petal-shaped seat portion 5*j*, and an outer diameter d4 is larger than the diameter of a virtual circle C3 (indicated by a dashed line) passing through the inner periphery on a seat surface 5*j*1 of the circular arc shaped portion P1 of the petal-shaped seat portion 5*j* and is smaller than the diameter of a virtual circle C4 passing through the outer periphery on the seat surface 5*j*1 of each of the circular arc shaped portions P1 as illustrated in FIG. 6. The seat surface 5*j*1 on the petal-shaped seat portion 5*j* is a surface that the leaf valve 20*a* to be spaced apart from or seated on, and is an upper end surface on the petal-shaped seat portion 5*j* in FIG. 7. The leaf valve 20*a* may be eccentrically laid on top of the circular arc shaped portion P1 of the petal-shaped seat portion 5*j* in the valve casing 5 such that not all the way around but part of the outer peripheral edge of the leaf valve 20*a* is disposed within the range of the virtual circle C3 and the virtual circle C4 as long as the leaf valve 20*a* abuts on the entirety of the circular arc shaped portions P1 on the petal-shaped seat portion 5*j*. Note that, a hole provided at the center of the leaf valve 20*a* is omitted from illustration in FIG. 6.

It should be noted that, unlike the leaf valve 22, the leaf valve 20*a* is not provided with a cutout orifice and a protruding portion, but may be provided with a cutout orifice, and the leaf valve 22 when provided with a cutout orifice may include a protruding portion on one side or both sides in the circumferential direction of the cutout orifice. When the leaf valve 20*a* is provided with a cutout orifice, the leaf valve 20*a* is required to be laid on top of the valve casing 5 with being positioned in the circumferential direction so that the cutout orifice faces the circular arc shaped portion P1 of the petal-shaped seat portion 5*j*. Furthermore, an orifice, which is formed by stamping or the like, may be provided in the petal-shaped seat portion 5*j* regardless of whether or not the cutout orifice is provided in the leaf valve 20*a*.

The annular plate group 20*b* stacked on the side of the leaf valve 20*a* facing toward the compression side chamber R2 is configured to include multiple annular plates. The outer diameter of each annular plate in the annular plate group 20*b* is smaller as the annular plate is disposed closer to the compression side chamber R2, but the design thereof can be freely modified. Note that, the fourth valve V4 of the present embodiment is configured to include: the valve casing 5 as a valve seat member including the suction port 5*e* and the petal-shaped seat portion 5*j* surrounding the suction port 5*e*; and the leaf valve 20*a*. In addition, the number of annular plates in the annular plate group 20*b* can be set freely, and it is also possible to adopt an aspect in which no annular plate group 20*b* is provided on the side of the leaf valve 20*a* opposite to the valve casing. In a case where a cutout orifice is provided in the leaf valve 20*a*, the outer diameter of the annular plate that abuts on the leaf valve 20*a* among the annular plates in the annular plate group 20*b* is required to be larger than the diameter of the virtual circle C3 passing through the inner periphery on the seat surface 5*j*1 of the circular arc shaped portion P1 of the petal-shaped seat portion 5*j*.

A spacer 25 having a diameter smaller than that of the annular plate 23*b*, the annular plate group 23, the leaf valve 22, the valve casing 5, and the check valve 20 are sequentially assembled to the outer periphery of the guide rod 21 fitted to the inner periphery of the valve casing 5, and they are fixed to the guide rod 21 with a nut 24 screwed to the distal end of the guide rod 21.

The leaf valve 22 is immovably fixed with the inner periphery abutting on the inner peripheral seat portion 5*f* of the valve casing 5 and the outer peripheral side thereof is seated on the seat portion 5*g*. In a state where the leaf valve 22 is seated on the seat portion 5*g*, the third valve V3 is closed, thereby allowing the damping port 5*d* to communicate with the reservoir R only through the cutout orifice 22*a*. Since the damping port 5*d* always communicates with the compression side chamber R2, when the third valve V3 is in closed state, hydraulic oil about to pass through the damping port 5*d* always passes through the cutout orifice 22*a* to move back and forth between the compression side chamber R2 and the reservoir R. Thus, when the third valve V3 is closed, the cutout orifice 22*a* creates resistance to the hydraulic oil flow passing through the extension side port 2*a*.

Since the outer periphery sides of the leaf valve 22 and the annular plate group 23 are allowed to deflect with the outer edge of the spacer 25 as a fulcrum of deflection, an increased pressure in the compression side chamber R2 acting via the damping port 5*d* causes the outer peripheral side thereof to deflect and the leaf valve 22 moves spaced apart from the seat portion 5*g* to open the third valve V3. In a state where the third valve V3 is opened, the leaf valve 22 and the annular plate group 23 both deflect and the leaf valve 22 moves spaced apart from the seat portion 5*g*, and thus the damping port 5*d* is allowed to communicate with the reservoir R via an annular gap formed between the leaf valve 22 and the seat portion 5*g* to create resistance to the hydraulic oil flow passing through the gap.

The inner peripheral side of the aforementioned check valve 20 is immovably fixed to the valve casing 5, and the outer peripheral side thereof is seated on the petal-shaped seat portion 5*j*. In a state where the leaf valve 20*a* is seated on the petal-shaped seat portion 5*j*, the fourth valve V4 is closed to disconnect communication between the suction port 5*e* and the compression side chamber R2. Since the suction port 5*e* always communicates with the reservoir R, when the fourth valve V4 is closed, the suction port 5*e* is blocked off by the leaf valve 20*a*, and the hydraulic oil cannot pass through the suction port 5*e*.

Since the outer peripheral side of the check valve 20 is allowed to deflect, when the pressure in the reservoir R acting via the suction port 5*e* becomes larger than the pressure in the compression side chamber R2 and the outer peripheral side thereof deflects, the leaf valve 20*a* moves spaced apart from the petal-shaped seat portion 5*j* to open the fourth valve V4. In a state where the fourth valve V4 is opened, the check valve 20 deflects as a whole, and the leaf valve 20*a* moves spaced apart from the petal-shaped seat portion 5*j*, and thus the suction port 5*e* and the compression side chamber R2 are allowed to communicate with each other, and the hydraulic oil can move from the reservoir R to the compression side chamber R2 through the suction port 5*e*. Thus, the check valve 20 is configured to be spaced apart from and seated on the petal-shaped seat portion 5*j* thereby setting the suction port 5*e* as a one-way passage that allows only the liquid flow from the reservoir R toward the compression side chamber R2.

Figure 10:
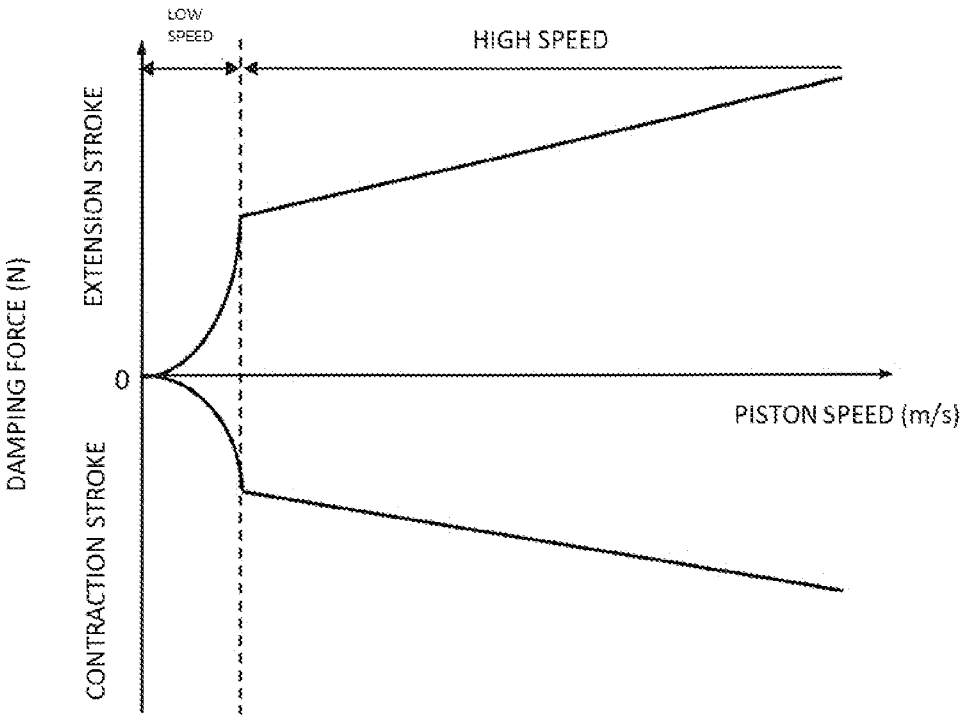
FIG. 10 is a diagram illustrating damping force characteristics of a shock absorber in a second modification of one embodiment.

The valves V1, V2, V3, and V4 and the shock absorber D are configured as described above. Next, the operation of the shock absorber D will be described. First, a case where the shock absorber D extends will be described. When the piston 2 moves upward in FIG. 1 with respect to the cylinder 1 and the shock absorber D is in an extension stroke, the extension side chamber R1 is compressed and the compression side chamber R2 is enlarged. When the piston speed, which is the moving speed of the piston 2 relative to the cylinder 1, is low, the pressure in the extension side chamber R1 is higher than the pressure in the compression side chamber R2, but the pressure difference between two chambers does not reach to the valve opening pressure of the first valve V1. For this reason, the leaf valve 10 in the first valve V1 remains seated on the extension-side seat portion 2*d*, and the hydraulic oil moves from the extension side chamber R1 to the compression side chamber R2 through the cutout orifice 10*a*. In this case, the second valve V2 is subjected to the pressure in the extension side chamber R1 and is pressed against the compression-side seat portion 2*g*, and thus shutting off the compression side port 2*b*. Thus, when the piston speed is in the low speed range in the extension stroke, the shock absorber D exerts a damping force by the aid of the cutout orifice 10*a* as illustrated in FIG. 10, and exerts a damping force having orifice-specific characteristics proportional to the square of the piston speed.

Since the piston rod 3 retracts in the cylinder 1 in the extension stroke of the shock absorber D, an amount of hydraulic oil equivalent to the volume of the piston rod 3 retracting in the cylinder 1 is insufficient in the cylinder 1. The amount of hydraulic oil insufficient in the cylinder 1 moves from the reservoir R to the compression side chamber R2 via the suction port 5*e* when the check valve 20 is opened or via the cutout orifice 22*a* in the leaf valve 22 of the third valve V3. Thus, the volume of the piston rod 3 retracting in the cylinder 1 in the extension of the shock absorber D is compensated by the supply of hydraulic oil from the reservoir R to the cylinder 1.

Next, when the piston speed during the extension stroke is high, the pressure difference between the extension side chamber R1 and the compression side chamber R2 increases, and when the differential pressure therebetween reaches the valve opening pressure of the leaf valve 10, the leaf valve 10 and the annular plate group 11 deflect, and the leaf valve 10 moves spaced apart from the extension-side seat portion 2*d* to open the extension side port 2*a*. Thereupon, the hydraulic oil passes through an annular gap emerged between the leaf valve 10 and the extension-side seat portion 2*d* and moves from the extension side chamber R1 to the compression side chamber R2. In addition, the pressure difference between the reservoir R and the compression side chamber R2 is increased and thus the check valve 20 provided in the valve casing 5 is opened to cause the suction port Se to open. The resistance to the hydraulic oil flow passing through the suction port 5*e* is set to be small when the check valve 20 is opened. Thus, the amount of hydraulic oil insufficient in the cylinder 1 passes through the suction port 5*e* and is supplied from the reservoir R to the cylinder 1. Therefore, when the piston speed is within the high speed range in the extension stroke, the valve characteristics of the leaf valve 10 emerge and the shock absorber D exerts a damping force having a characteristic approximately proportional to the piston speed as shown in FIG. 10.

As for the first valve V1, the outer diameter of the leaf valve 10 is larger than the inner diameter S1 and smaller than the outer diameter S2 of the seat surface 2*d*1 of the extension-side seat portion 2*d* facing the leaf valve 10, and thus the contact area of the leaf valve 10 to the extension-side seat portion 2*d* is smaller than the area of the seat surface 2*d*1 of the extension-side seat portion 2*d*. In this manner, according to the first valve V1 of the present embodiment, the contact area on the leaf valve 10 in contact with the extension-side seat portion 2*d* which is the seat portion can be made smaller than the entire area of the seat surface 2*d*1 of the extension-side seat portion 2*d*, so that the sticking force can be reduced even if the leaf valve 10 sticks fast to the extension-side seat portion 2*d*. Therefore, according to the first valve V1 of the present embodiment, the leaf valve 10 can move smoothly spaced apart from the extension-side seat portion 2*d* even if sticking fast to the extension-side seat portion 2*d*, and no more large vibrations occur at the time when the leaf valve 10 moves spaced apart from the extension-side seat portion 2*d*.

Additionally, since the outer diameter of the leaf valve 20*a* on the fourth valve V4 is larger than the outer diameter of the virtual circle C3 passing through the inner periphery of the seat surface 5*j*1 of the circular arc shaped portion P1 which the corresponding petal-shaped seat portion 5*j* to be spaced apart from or seated on, and is smaller than the virtual circle C4 passing through the outer periphery of the petal-shaped seat surface 5*j*1, the contact area of the leaf valve 20*a* to the circular arc shaped portion P1 of the petal-shaped seat portion 5*j* is smaller than the area of the seat surface 5*j*1 of the circular arc shaped portion P1 of the petal-shaped seat portion 5*j*. In this manner, according to the fourth valve V4 of the present embodiment, since the contact area on the leaf valve 20*a* in contact with the seat surface 5*j*1 of the circular arc shaped portion P1 of the petal-shaped seat portion 5*j* which is the seat portion can be made smaller than the entire area of the seat surface 5*j*1 in the circular arc shaped portion P1, the sticking force can be reduced even if the leaf valve 20*a* sticks fast to the petal-shaped seat portion 5*j*. Therefore, according to the fourth valve V4 of the present embodiment, the leaf valve 20*a* can move smoothly spaced apart from the petal-shaped seat portion 5*j* even if sticking fast to the petal-shaped seat portion 5*j*, and no more large vibrations occur at the time when the leaf valve 20*a* moves spaced apart from the petal-shaped seat portion 5*j*.

Next, a case where the shock absorber D contracts will be described. When the piston 2 moves downward (in FIG. 1) with respect to the cylinder 1 and the shock absorber D is in the contraction stroke, the compression side chamber R2 is compressed and the extension side chamber R1 is enlarged. When the piston speed is low, the pressure in the compression side chamber R2 is higher than the pressure in the extension side chamber R1, but the pressure difference between the two chambers is small, and the second valve V2 does not open. Since the leaf valve 10 in the first valve V1 is subjected to the pressure in the compression side chamber R2 and is pressed against the extension-side seat portion 2*d*, the first valve V1 does not open, and hence the hydraulic oil flowing from the compression side chamber R2 toward the extension side chamber R1 moves through the cutout orifice 10*a*. In addition, since the piston rod 3 moves further into the cylinder 1 during the contraction stroke of the shock absorber D, the amount of hydraulic oil equivalent to the volume of the piston rod 3 moving further into the cylinder 1 becomes excessive in the cylinder 1. When the piston speed is low, the pressure difference between the compression side chamber R2 and the reservoir R is small, and thus the leaf valve 22 in the third valve V3 does not move apart from the seat portion 5*g*, and the third valve V3 remains closed. Thus, the hydraulic oil passes through the damping port 5*d* via the cutout orifice 22*a* of the leaf valve 22 and moves from the compression side chamber R2 to the reservoir R. Therefore, when the piston speed is in the low speed range during contraction stroke, the shock absorber D exerts a damping force by the aid of the cutout orifice 22*a* and exerts a damping force having orifice-specific characteristics proportional to the square of the piston speed as illustrated in FIG. 10.

When the piston speed during contraction stroke is high, the pressure difference between the compression side chamber R2 and the reservoir R increases, and when the differential pressure between the chambers reaches the valve opening pressure of the third valve V3, the leaf valve 22 and the annular plate group 23 deflect, and the leaf valve 22 moves spaced apart from the seat portion 5*g* to open the damping port 5*d*. Thereupon, the hydraulic oil passes through the annular gap emerged between the leaf valve 22 and the seat portion 5*g* and moves from the compression side chamber R2 to the reservoir R, and the third valve V3 creates resistance to this hydraulic oil flow. In addition, since the pressure difference between the compression side chamber R2 and the extension side chamber R1 increases, the second valve V2 provided in the piston 2 opens to cause the compression side port 2*b* to open, and the hydraulic oil moves from the inside of the compression side chamber R2 to the extension side chamber R1. Thus, when the piston speed is in the high speed range during contraction stroke, the third valve V3 is provided creates resistance to the hydraulic oil flow, the pressure increases in the cylinder 1. Therefore, when the piston speed is within the high speed range during contraction stroke, the valve characteristics of the leaf valves 12 and 22 emerge and the shock absorber D exerts a damping force having a characteristic approximately proportional to the piston speed as shown in FIG. 10. Note that, the second valve V2 is configured to create resistance to the hydraulic oil flow passing through the compression side port 2*b* when the second valve V2 is opened, but may be configured to create little resistance.

Since the outer diameter of the leaf valve 12 on the second valve V2 is larger than the virtual circle C1 passing through the inner periphery of the seat surface 2g1 of the circular arc shaped portion P that the corresponding compression-side seat portion 2g to be spaced apart from or seated on, and is smaller than the virtual circle C2 passing through the outer periphery of the seat surface 2g1, the contact area of the leaf valve 12 to the circular arc shaped portion P of the compression-side seat portion 2g is smaller than the area of the seat surface 2g1 of the circular arc shaped portion P of the compression-side seat portion 2g. In this manner, according to the second valve V2 of the present embodiment, the contact area on the leaf valve 12 in contact with the seat surface 2g1 of the circular arc shaped portion P of the compression-side seat portion 2g which is the seat portion can be made smaller than the entire area of the seat surface 2g1 on the circular arc shaped portion P, and hence the sticking force can be reduced even if the leaf valve 12 sticks fast to the compression-side seat portion 2g. Therefore, according to the second valve V2 of the present embodiment, the leaf valve 12 can move smoothly spaced apart from the compression-side seat portion 2g even if the leaf valve 12 sticks fast to the compression-side seat portion 2g, and no more large vibrations occur at the time when the leaf valve 12 moves spaced apart from the compression-side seat portion 2g. Note that, in the third valve V3, since the outer diameter of the leaf valve 22 is larger than the inner diameter S3 and smaller than the outer diameter S4 of the seat surface 5g1 of the seat portion 5g facing the leaf valve 22, as with the first valve V1, the leaf valve 22 can move smoothly spaced apart from the seat portion 5g even if the leaf valve 22 sticks fast to the seat portion 5g, and no more large vibrations occur at the time when the leaf valve 22 moves spaced apart from the seat portion 5g.

As described above, the shock absorber D causes the first valve V1 to generate damping force during extension and the valves V2, V3 to generate damping force during contraction thereby attenuating a vibration to be input. The valve V1, V3 of the present embodiment include: the piston 2 or the valve casing 5 as a valve seat member equipped with the port 2a, 5d and the circular annular shaped seat portion 2d, 5g protruding from the end portion on the outlet end side of the port 2a, 5d and surrounding the outlet end; and the annular leaf valve 10, 22 whose inner periphery is immovably laid on top of the piston 2 or on top of the valve casing 5 as a valve seat member and whose outer periphery is to be spaced apart from or seated on the seat portion 2d, 5g, and the outer diameter of the leaf valve 10, 22 is larger than the inner diameter S1, S3 of the seat surface 2d1, 5g1 that the leaf valve 10, 22 of the seat portion 2d, 5g is to be spaced apart from or seated on, and is smaller than the outer diameter S2, S4 of the seat surface 2d1, 5g1 of the seat portion 2d, 5g.

According to the valve V1, V3 configured as described above, the contact area of the leaf valve 10, 22 to the seat portions 2d, 5g can be made smaller to reduce the sticking force of the leaf valve 10, 22 to the seat portion 2d, 5g, and thus the leaf valve 10, 22 can move smoothly spaced apart from the seat portion 2d, 5g even if the leaf valve 10, 22 sticks fast to the seat portion 2d, 5g, thereby enabling to suppress vibration at the time when the leaf valve 10, 22 moves apart from the seat portion 2d, 5g. In addition, the implementation of the valve V1, V3 configured as described above into the shock absorber D enables to suppress the occurrence of vibration of the leaf valve 10, 22 at the time of opening and closing the valve V1, V3, so that the occurrence of abnormal sound from the shock absorber D can be suppressed, and no discomfort to passengers is caused when the shock absorber D is implemented into the vehicle and hence the quietness in the vehicle can be improved.

Note that, according to the valves V1, V3 of the present embodiment, the outer diameter of the leaf valve 10, 22 is configured to be larger than the inner diameter S1, S3 on the seat surface 2d1, 5g1 and smaller than the outer diameter S2, S4 of the seat surface 2d1, 5g1 because the leaf valve 10, 22 and the seat surface 2d1, 5g1 on the seat portion 2d, 5g each have a circular annular shape, however, the leaf valve 10, 22 and the seat surface 2d1, 5g1 may have a shape other than a circular annular shape as long as they are annular. In this case, the external shape which is the outer peripheral shape of the leaf valve 10, 22 may be configured to be larger than the internal shape which is the inner peripheral shape of the seat surface 2d1, 5g1 and smaller than the external shape of the seat surface 2d1, 5g1. It should be noted that the definition of the external shape of the leaf valve 10, 22 being larger than the internal shape that is the inner peripheral shape of the seat surface 2d1, 5g1 and smaller than the external shape of the seat surface 2d1, 5g1 refers to that the leaf valve 10, 22 has a shape such that the outer peripheral edge of the leaf valve 10, 22 fits within the range between the inner peripheral edge and the outer peripheral edge of the seat surface 2d1, 5g1 when the leaf valve 10, 22 is laid on top of the seat surface 2d1, 5g1 as viewing the leaf valve 10, 22 and the seat surface 2d1, 5g1 from the axial direction. Therefore, the leaf valve 10, 22 and the seat surface 2d1, 5g1 may be formed into a shape such as a rectangular shape or an elliptical shape other than a circular shape as long as they are annular, and the seat surface 2d1, 5g1 may surround the plurality of ports 2a, 5d each independently without allowing the plurality of ports 2a, 5d to communicate with each other as long as the seat surface 2d1, 5g1 is annular.

Furthermore, the valve V2, V4 of the present embodiment includes: the piston 2 or the valve casing 5 as a valve seat member equipped with the port 2b, 5e and the seat portion 2g, 5j protruding from the end portion of the port 2b, 5e seat portion 2g, 5j on the outlet end side of the port 2b, 5e and surrounding the outlet end and partly including multiple circular arc shaped portions P, P1 arranged on an identical circumference; and annular leaf valve 12, 20a whose inner periphery is immovably laid on top of the piston 2 or of the valve casing 5 and whose outer periphery to be spaced apart from or seated on the seat portion 2g, 5j, and the outer diameter of the leaf valve 12, 20a is larger than the diameter of the virtual circle C1, C3 passing through the inner periphery of the seat surface 2g1, 5j1 that the leaf valve 12, 20a of each of the circular arc shaped portions P, P1 to be spaced apart from or seated on, and smaller than the diameter of the virtual circle C2, C4 passing through the outer periphery of the seat surface 2g1, 5j1 of each of the circular arc shaped portions P, P1.

Even when the valve V2, V4 is configured in this manner, the sticking force of the leaf valve 12, 20a to the seat portion 2g, 5j can be reduced by making the contact area of the leaf valve 12, 20a to the seat portion 2g, 5j smaller, so that the leaf valve 12, 20a can move smoothly spaced apart from the seat portion 2g, 5j even when the leaf valve 12, 20a sticks fast to the seat portion 2g, 5j, so that the vibration at the time when the leaf valve 12, 20a moves apart from the seat portion 2g, 5j can be suppressed. In addition, the implementation of the valve V2, V4 configured as described above into the shock absorber D enables to suppress the occurrence of vibration of the leaf valve 12, 20a at the time when opening and closing the valve V2, V4, thereby enabling to suppress the occurrence of abnormal sound in the shock absorber D, and no discomfort to passengers is caused when the shock absorber D is implemented into the vehicle and thus the quietness in the vehicle can be improved.

As described above, according to the valves V1, V2, V3, V4 of the present embodiment, the occurrence of abnormal sound in the shock absorber D can be prevented to improve quietness in the vehicle.

Figure 11:
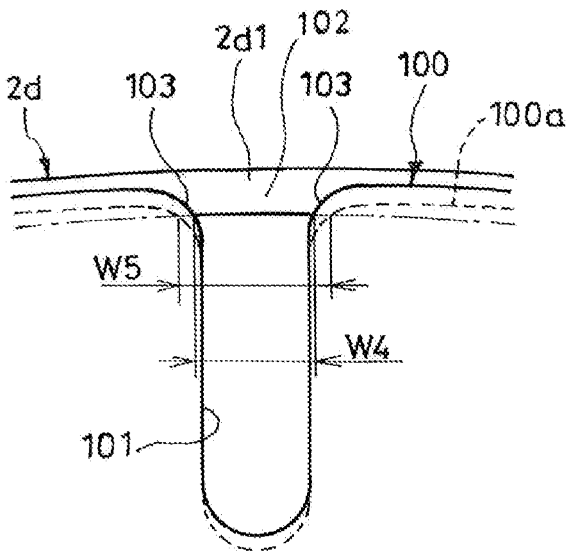
FIG. 11 is a diagram illustrating a state in which a conventional leaf valve is laid on top of a circular annular shaped seat portion.

In addition, the leaf valve 10 has an inner diameter larger than the inner diameter S1 of the seat surface 2*d*1 of the extension-side seat portion 2*d* and an outer diameter smaller than the outer diameter S2 of the seat surface 2*d*1 of the extension-side seat portion 2*d*, and includes a cutout orifice 10*a* on the outer periphery. Additionally, the protrusions 10*b*, 10*b* are provided on both sides in the circumferential direction of the cutout orifice 10*a* of the leaf valve 10, and the chamfered portions 10*c*, 10*c* are provided only at the protrusions 10*b*, 10*b*, and the cutout orifice 10*a* has a constant width of W1 at least within the range of the outer diameter d1 of the leaf valve 10. The leaf valve 10 is often manufactured by punching a thin plate material with a die, and thus burrs are formed at the corner when the outer peripheral shape of the leaf valve 10 includes a sharp corner, and the life of dies that can be used in punching is shortened. For this reason, provisions of the round chamfered portions 103, 103 are conventionally carried out on both sides in the circumferential direction of the cutout orifice 101 in the opening edge 102 of the cutout orifice 101 to the outer periphery of the leaf valve 100 as illustrated in FIG. 11 when the cutout orifice 101 is formed in the leaf valve 100. However, when the outer diameter of the leaf valve 100 is made larger than the inner diameter S1 of the seat surface 2*d*1 of the extension-side seat portion 2*d* and smaller than the outer diameter S2 as in the leaf valve 10 in order to reduce the sticking force of the leaf valve 100 to the extension-side seat portion 2*d*, the round chamfered portions 103, 103 on the outer periphery of the leaf valve 100 are to be spaced apart from or seated on the seat surface 2*d*1 of the extension-side seat portion 2*d*. Here, when the cutout orifice 101 functions as an orifice, the cutout orifice 101 abuts on the extension-side seat portion 2*d* and the annular plate 11*a* to restrict the flow passage area (which is an area of the opening edge of the cutout orifice 101) to an area obtained when multiplying the width of the cutout orifice 101 facing the inner periphery on the seat surface 2*d*1 of the extension-side seat portion 2*d* by the thickness of the leaf valve 100.

However, the width of the cutout orifice 101 increases toward the outer periphery in the round chamfered portions 103, 103 on the outer periphery of the leaf valve 100, whereby the portion of the round chamfered portions 103, 103 face the inner periphery of the seat surface 2*d*1 of the extension-side seat portion 2*d* as viewed in the axial direction. As described above, the width of the cutout orifice 101 increases toward the outer periphery of the leaf valve 10 because of the round chamfered portions 103, 103 provided on the outer periphery of the leaf valve 100. For this reason, a targeted portion in the range of the round chamfered portions 103, 103 is not always possible to face the inner periphery of the seat surface 2*d*1 of the extension-side seat portion 2*d* as viewed in the axial direction if there are any dimensional error in the outer diameter of the leaf valve 100, any dimensional error in the round chamfered portions 103, 103, any dimensional error in the extension-side seat portion 2*d*, and any axial misalignment upon the assembling to a piston or a valve casing. For example, when the leaf valve is shifted downward in FIG. 11 with respect to the extension-side seat portion 2*d* as in the case of the leaf valve 100*a* indicated by the dashed line in FIG. 11, the width W5 of the cutout orifice in the portion of the leaf valve 100*a* (indicated by the dashed line) facing the inner periphery of the extension-side seat portion 2*d* is larger than the width W4 of the cutout orifice 101 in the portion of the leaf valve 100 (indicated by the solid line) facing the inner periphery of the extension-side seat portion 2*d*, and hence there can be seen that the flow passage area restricted by the cutout orifice is larger in the case of the leaf valve 100*a* indicated by the dashed line than in the case of the leaf valve 100 indicated by the solid line. When simply providing the round chamfered portions 103, 103 on both sides of the cutout orifice 101 on the outer periphery of the leaf valve 100 in this way, it is not sure which part of the round chamfered portions 103, 103 faces the inner periphery of the seat surface 2*d*1 of the extension-side seat portion 2*d*, and there will be variations in the flow passage area in a scene where the cutout orifice 101 functions as an orifice, consequently the resistance that the cutout orifice 101 creates to the hydraulic oil flow varies among products. In addition, in a case of manufacturing the leaf valve 100 by punching using a die, the shape of the round chamfered portions 103, 103 may be changed from the designed shape due to the wear of the die whereby the flow passage area restricted by the cutout orifice 101 changes and the resistance that the cutout orifice 101 creates to the hydraulic oil flow deviates from the designed value.

However, in the valve V1, V3 of the present embodiment, the protrusions 10*b*, 22*b* protruding outward are provided on both sides in the circumferential direction of the cutout orifice 10*a*, 22*a* on the outer periphery of the leaf valve 10, 22, and the chamfered portions 10*c*, 22*c* are provided on both sides in the circumferential direction of the distal ends of the protrusions 10*b*, 22*b*. When the chamfered portions 10*c*, 22*c* are provided in this manner, no sharp corner portions are formed in the outer peripheral shapes of the leaf valve 10, 22, and no large burrs are formed in the leaf valve 10, 22, so that dies used when punching the leaf valve 10, 22 are not subjected to an excessive load resulting in an extended life of dies. Additionally, when the protrusions 10*b*, 22*b* are provided on both sides in the circumferential direction of the cutout orifice 10*a*, 22*a* on the outer periphery of the leaf valve 10, 22, the portion of the cutout orifice 10*a*, 22*a* that faces the inner periphery of the seat surface 2*d*1, 5*g*1 of the corresponding seat portion 2*d*, 5*g* is the portion within a range where the cutout orifice 10*a*, 22*a* has a constant width, and the chamfered portions 10*c*, 22*c* face the seat surface 2*d*1, 5*g*1 of the seat portion 2*d*, 5*g* only within a range beyond the inner periphery toward the outer peripheral side even if the chamfered portions 10*c*, 22*c* are provided in the protrusions 10*b*, 22*b*. Therefore, when the cutout orifice 10*a*, 22*a* functions as an orifice to restrict the flow passage, the flow passage area is always an area obtained when multiplying the constant width W1, W3 of the cutout orifice 10*a*, 22*a* by the thickness of the leaf valve 10, 22, so that a variation in the flow passage area among products can be minimized. Additionally, in the case where the protrusions 10*b*, 22*b* are provided on both sides of the cutout orifice 10*a*, 22*a* in the circumferential direction on the outer periphery of the leaf valve 10, 22, the chamfered portions 10*c*, 22*c* face the seat surface 2*d*1, 5*g*1 of the seat portion 2*d*, 5*g* only within a range beyond the inner periphery toward the outer peripheral side even if the die is worn out in long-term use and the shape of the chamfered portions 10*c*, 22*c* provided in the protrusions 10*b*, 22*b* is changed. Therefore, when the cutout orifice 10*a*, 22*a* functions as an orifice to restrict the flow passage, the flow passage area is always an area obtained when multiplying the constant width W1, W3 of the cutout orifice 10*a*, 22*a* by the thickness of the leaf valve 10, 22, and thus, even if the die for punching the leaf valve 10, 22 wears, the variation in the flow passage area among products can be minimized.

As described above, the valve V1, V3 of the present embodiment includes the annular plate 11*a*, 23*a* which is stacked on the side of the leaf valve 10, 22 opposite to the valve seat member and whose outer diameter is set to be equal to or larger than the inner diameter S1, S3 of the seat surface 2*d*1, 5*g*1, and the leaf valve 10, 22 includes: the cutout orifice 10*a*, 22*a* opened from the outer periphery; and the protrusions 10*b*, 22*b* protruding outward from the outer periphery of the cutout orifice 10*a*, 22*a* on one side or both sides in the circumferential direction on the outer periphery. The valve V1, V3 configured as described above can minimize the variation in the flow passage area among products when the cutout orifice 10*a*, 22*a* functions as an orifice. Note that the shape of the annular plate 11*a*, 23*a* is not required to be circular annular, and in the case of not being circular annular, the external shape which is the outer peripheral shape of the annular plate 11*a*, 23*a* is required to be larger than the outer diameter of the seat surface 2*d*1, 5*g*1. Furthermore, even when the shapes of the leaf valve 10, 22 and the seat surface 2*d*1, 5*g*1 are not circular annular, the provision of the cutout orifice 10*a*, 22*a* and the protrusions 10*b*, 22*b* protruding outward from the outer periphery that is the outer periphery of the cutout orifice 10*a*, 22*a* on one side or both sides in the circumferential direction to the leaf valve 10, 22 enables to minimize variation in the flow passage area among products when the cutout orifice 10*a*, 22*a* functions as an orifice.

Furthermore, the valve V1, V3 of the present embodiment includes an annular plate 11*a*, 23*a* which is stacked on the side of the leaf valve 10, 22 opposite to the valve seat member and whose outer diameter is set to be equal to or larger than the inner diameter S1, S3 of the seat surface 2*d*1, 5*g*1, the leaf valve 10, 22 includes: a cutout orifice 10*a*, 22*a* opened from the outer periphery; and protrusions 10*b*, 22*b* protruding outward from the outer periphery that is the outer periphery of the cutout orifice 10*a*, 22*a* on one side or both sides in the circumferential direction, and chamfered portions 10*c*, 22*c* are provided at both ends in the circumferential direction on the side of the distal end of the protrusions 10*b*, 22*b*. According to the valve V1, V3 configured as described above, not only variation in the flow passage area among products can be minimized when the cutout orifice 10*a*, 22*a* functions as an orifice, but also no sharp corners are formed in the outer peripheral shape of the leaf valve 10, 22 when the leaf valve 10, 22 is manufactured by punching, so that the formation of large burrs can be suppressed and dies used for punching have an extended life.

Therefore, when such valves V1, V3 are implemented into the shock absorber D, the shock absorber D can generate damping force with little variation among products when the cutout orifice 10*a*, 22*a* functions as an orifice to restrict the flow path because the cutout orifice 10*a*, 22*a* can create stable resistance to the hydraulic oil flow passing therethrough with little variation with respect to the design value.

Note that, the shape of the cutout orifice 10*a*, 22*a* provided to the leaf valve 10, 22 is a straight shape with a constant width W1, W3 within the range of the outer diameter d1, d3 except for the distal end, however, the width W1, W3 is only required to be constant in the range facing the inner periphery of the seat surface 2*d*1, 5*g*1 of the seat portion 2*d*, 5*g* even with a dimensional error and an assembling error as can be understood from the description set forth above, and the shape radically inward from that range can be freely modified on the condition that no sharp corners are formed.

The chamfered portion 10*c*, 22*c* of the protrusion 10*b*, 22*b* is formed by round chamfering, but may be formed by c-beveling to have a C chamfered plane. Note that, when the chamfered portions 10*c*, 22*c* are formed by round chamfering as in the first valve V1 and the third valve V3, no corner portions are formed at all at the distal ends of the protrusions 10*b*, 22*b*, so that the life of dies for punching the leaf valve 10, 22 can be effectively extended. Incidentally, it is preferred that the base portion 10*d*, 22*d* of the protrusion 10*b*, 22*b* on the side opposite to the cutout orifice in the leaf valve 10, 22 is also formed in a round shape or a tapered shape so as not to form sharp corner portions, as in the valves V1, V3 illustrated in FIGS. 5 and 8. When the base portion 10*d*, 22*d* of the protrusion 10*b*, 22*b* is formed in a round shape or a tapered shape in this manner, there can be alleviated an abrupt change in the shape of a connecting portion from the outer periphery of the leaf valve 10, 22 to the protrusion 10*b*, 22*b*, and stress concentration on this portion can be avoided when the leaf valve 10, 22 deflects, thereby improving the durability of the leaf valve 10, 22.

In the description set forth above, the protrusions 10*b*, 22*b* are provided on both sides in the circumferential direction of the cutout orifice 10*a*, 22*a* for the leaf valve 10, 22 including the cutout orifice 10*a*, 22*a*, however, it is also possible to adopt an aspect in which the protrusion 10*b*, 22*b* is provided on only one side instead of both sides in the circumferential direction of the cutout orifice 10*a*, 22*a* for the leaf valve 10, 22. Even when the protrusion 10*b*, 22*b* is provided only on one side in the circumferential direction of the cutout orifice 10*a*, 22*a* for the leaf valve 10, 22, variations in the flow passage area when the cutout orifice 10*a*, 22*a* functions as an orifice can be reduced even if there are any dimensional error in the leaf valve 10, 22 and the seat portion 2*d*, 5*g*, or any assembling error in the leaf valve 10, 22 with respect to the seat portion 2*d*, 5*g*. Therefore, even when the protrusion 10*b*, 22*b* is provided only on one side in the circumferential direction of the cutout orifice 10*a*, 22*a* for the leaf valve 10, 22, variation in the flow passage area among products when the cutout orifice 10*a*, 22*a* function as an orifice can be reduced.

Furthermore, the protrusion 10*b*, 22*b* of the valve V1, V3 of the present embodiment radically protrudes toward the outer peripheral side of the seat portion 2*d*, 5*g* in a state where the leaf valve 10, 22 is seated on the circular annular shaped seat portion 2*d*, 5*g*. In the valve V1, V3 configured in this manner, the protrusion 10*b*, 22*b* protrudes toward the outer peripheral side of the seat portion 2*d*, 5*g*, and thus the chamfered portion 10*c*, 22*c* of the protrusion 10*b*, 22*b* can be reliably prevented from facing the inner diameter of the seat portion 2*d*, 5*g* even if there is any large dimensional error in the leaf valve 10, 22 and the seat portion 2*d*, 5*g*. Thus, the valve V1, V3 configured in this manner can reliably minimize the variation in the flow passage area among products when the cutout orifice 10*a*, 22*a* functions as an orifice. Therefore, the implementation of such valve V1, V3 into the shock absorber D can reliably reduce variation in the damping force of the shock absorber D among products. In addition, in a case where the leaf valve 10, 22 provided with the protrusion 10*b*, 22*b* is spaced apart from or seated on the petal-shaped compression-side seat portion 2*g* of the piston 2 or the petal-shaped seat portion 5*j* of the valve casing 5, when the protrusion 10*b*, 22*b* is allowed to radically protrude further outwardly with respect to the circular arc shaped portion P, P1 in a state where the leaf valve 10 is seated on the circular arc shaped portion P, P1, the variation in the flow passage area among products can be reliably minimized when the cutout orifice 10*a* functions as an orifice, as in the case of the valves V1, V3. In addition, in a case where the leaf valve 10, 22 including the protrusion 10*b*, 22*b* is spaced apart from or seated on the petal-shaped compression-side seat portion 2*g* of the piston 2 or the petal-shaped seat portion 5*j* of the valve casing 5, the outer diameter of the annular plate 11*a*, 23*a* stacked on the side of the leaf valve 10, 22 opposite to the valve seat member is required to be set to be equal to or larger than the diameter of the virtual circle C1, C3 passing through the inner periphery on the seat surface 2*g*1, 5*j*1 of each of the circular arc shaped portions P, P1.

In addition, the shock absorber D of the present embodiment includes: the outer tube (tube) 4; the piston rod 3 axially movably inserted into the outer tube (tube) 4; the extension side chamber R1, the compression side chamber R2, and the reservoir R, those are as a plurality of working chambers which are formed inside the outer tube (tube) 4 and in which hydraulic liquid is filled; and the valves V1, V2, V3, V4, wherein the working chambers communicate with each other through the ports 2*a*, 2*b*, 5*d*, 5*e*. The shock absorber D configured in this manner can suppress the occurrence of vibration of the leaf valves 10, 12, 22, 20*a* at the time of opening and closing the valves V1, V2, V3, V4, thereby enabling to suppress the occurrence of abnormal sound, so that the quietness in the vehicle can be improved because no discomfort to passengers is caused when the shock absorber D is implemented into the vehicle. Note that the shock absorber D is configured to be a double cylinder type shock absorber in the description set forth above, but may be configured as a monotube shock absorber. In order to create the monotube shock absorber, a tube is configured as the cylinder 1, the outer tube 4, the valve casing 5, the third valve V3, and the fourth valve V4 are removed from the configuration of the shock absorber D described above, and instead, a free piston for creating a gas chamber in the cylinder 1 is provided to compensate the volume of the piston rod 3 in the cylinder 1 moving inward and outward in the cylinder 1, thereby allowing the valves V1 and V2 to generate damping force.

The detailed description of preferred embodiments of the present invention has been made above, however, modifications, variations, and changes thereof can be made without departing from the scope of the claims.

REFERENCE SIGNS LIST

1 Cylinder (tube)
2 Piston (valve seat member)
2*a* Extension side port (port)
2*b* Compression side port (port)
2*d* Extension-side seat portion (seat portion)
2*d*1, 2*g*1, 5*g*1, 5*j*1 Seat surface
2*g* Compression-side seat portion (seat portion)
3 Piston rod
4 Outer tube (tube)
5 Valve casing (valve seat member)
5*d* Damping port (port)
5*e* Suction port
5*g* Seat portion
5*j* Petal-shaped seat portion (seat portion)
10, 12, 20*a*, 22 Leaf valve
10*a*, 22*a* Cutout orifice
10*b*, 22*b* Protrusion
10*c*, 22*c* Chamfered portion
11*a*, 23*a* Annular plate
C1, C2, C3, C4 Virtual circle
D Shock absorber
d1, d2, d3, d4 Outer diameter of leaf valve
P Circular arc shaped portion
R Reservoir (working chamber)
R1 Extension side chamber (working chamber)
R2 Compression side chamber (working chamber)
S1, S3 Inner diameter of seat surface
S2, S4 Outer diameter of seat surface
V1 First valve
V2 Second valve
V3 Third valve
V4 Fourth valve

The invention claimed is:

1. A valve comprising:

a valve seat member equipped with a port and a seat portion, the seat portion having an annular shape and protruding from an end portion of the seat portion on an outlet end side of the port and surrounding the outlet end;

a leaf valve having an annular shape, an inner periphery of the leaf valve being immovably laid on top of the valve seat member and an outer periphery of the leaf valve being to be spaced apart from or seated on the seat portion; and an annular plate stacked on a side of the leaf valve opposite to the valve seat member, wherein an external shape of the leaf valve is larger than an internal shape of a seat surface of the seat portion that the leaf valve to be spaced apart from or seated on, and smaller than an external shape of the seat surface of the seat portion, an external shape of the annular plate is equal to or larger than an internal shape of the seat surface, and the leaf valve includes a cutout orifice having an opening from an outer periphery, and a protrusion protruding outward from one side or both sides in a circumferential direction of the cutout orifice on outer periphery.

2. The valve according to claim 1, wherein the protrusion is configured to radially protrude toward an outer peripheral side further outward from the seat portion in a state where the leaf valve is seated on the seat portion that has an annular shape.

3. A valve comprising:

a valve seat member equipped with a port and a seat portion, the seat portion protruding from an end portion of the seat portion on an outlet end side of the port and surrounding the outlet end, and part of the seat portion including a plurality of circular arc shaped portions arranged on an identical circumference;

a leaf valve having a circular annular shape, an inner periphery of the leaf valve being immovably laid on top of the valve seat member and an outer periphery of the leaf valve being to be spaced apart from or seated on the seat portion; and an annular plate stacked on a side of the leaf valve opposite to the valve seat member, wherein an outer diameter of the leaf valve is larger than a diameter of a virtual circle passing through an inner periphery on a seat surface of each of the circular arc shaped portions that the leaf valve to be spaced apart from or seated on, and is smaller than a diameter of a virtual circle passing through an outer periphery of the seat surface of each of the circular arc shaped portions, an outer diameter of the annular plate is set to be equal to or larger than a diameter of a virtual circle passing through an inner periphery on the seat surface of each of the circular arc shaped portions, and the leaf valve includes a cutout orifice having an opening from an outer periphery, and a protrusion protruding outward from one side or both sides in a circumferential direction of the cutout orifice on outer periphery.

4. The valve according to claim 1, wherein chamfered portions are provided at both circumferential ends on distal end side of the protrusion.

5. The valve according to claim 4, wherein the chamfered portion at the protrusion is formed to have a round profile by round chamfering.

6. A shock absorber comprising:

a tube;

a piston rod axially movably inserted into the tube;

a plurality of working chambers which are formed inside the tube and into which a hydraulic liquid is filled; and the valve according to claim 1, wherein the working chambers communicate with each other through the port.

7. The valve according to claim 3, wherein the protrusion is configured to radially protrude toward an outer peripheral side further outward from the circular arc shaped portion in a state where the leaf valve is seated on the seat portion that has the circular arc shaped portion.

8. The valve according to claim 3, wherein chamfered portions are provided at both circumferential ends on distal end side of the protrusion.

9. The valve according to claim 8, wherein the chamfered portion at the protrusion is formed to have a round profile by round chamfering.

10. A shock absorber comprising:

a tube;

a piston rod axially movably inserted into the tube;

a plurality of working chambers which are formed inside the tube and into which a hydraulic liquid is filled; and the valve according to claim 3, wherein the working chambers communicate with each other through the port.

* * * * *